United States Patent [19]

Hollenbeck et al.

[11] Patent Number: 5,557,182

[45] Date of Patent: Sep. 17, 1996

[54] SYSTEM AND METHODS FOR CONTROLLING A DRAFT INDUCER TO PROVIDE A DESIRED OPERATING AREA

[75] Inventors: Robert K. Hollenbeck; Mark A. Brattoli, both of Fort Wayne, Ind.

[73] Assignee: General Electric Company, Fort Wayne, Ind.

[21] Appl. No.: 299,528

[22] Filed: Sep. 1, 1994

Related U.S. Application Data

[63] Continuation-in-part of Ser. No. 25,371, Feb. 26, 1993, Pat. No. 5,418,438.

[51] Int. Cl.$^6$ ........................................... H02P 7/00
[52] U.S. Cl. .......................... 318/432; 318/254; 318/434; 318/430; 318/138; 318/439
[58] Field of Search ..................... 388/903; 318/138, 318/439, 254, 434, 432, 430

[56] References Cited

U.S. PATENT DOCUMENTS

| | | | |
|---|---|---|---|
| 3,426,273 | 2/1969 | Kuntz et al. | 324/68 |
| 3,517,308 | 6/1970 | Mirdadian | 324/68 |
| 3,550,426 | 12/1970 | Griffo | 73/3 |
| 3,765,234 | 10/1973 | Sievert | 73/136 R |
| 3,818,298 | 6/1974 | Eriksson | 318/227 |
| 3,955,130 | 5/1976 | Graf | 318/332 |
| 4,005,347 | 1/1977 | Erdman | 318/254 |
| 4,009,825 | 3/1977 | Coon | 165/22 |
| 4,012,677 | 3/1977 | Rist et al. | 318/434 |
| 4,044,287 | 8/1977 | Ratzel et al. | 318/432 |
| 4,097,789 | 6/1978 | Doemen | 318/461 |
| 4,099,111 | 7/1978 | Inaba et al. | 318/338 |
| 4,169,990 | 10/1979 | Lerdman | 318/138 |
| 4,274,036 | 6/1981 | Fukasaku et al. | 318/331 |
| 4,371,823 | 2/1983 | Lohest | 318/434 |
| 4,384,241 | 5/1983 | Stillhard | 318/138 |
| 4,389,886 | 6/1983 | Korczak | 73/168 |
| 4,390,826 | 8/1983 | Erdman et al. | 318/439 |
| 4,392,417 | 7/1983 | Johannsen | 98/1.5 |
| 4,449,079 | 5/1984 | Erdman | 318/138 |
| 4,467,657 | 8/1984 | Olsson | 73/861 |

(List continued on next page.)

FOREIGN PATENT DOCUMENTS

| | | | |
|---|---|---|---|
| 0073717 | 8/1982 | European Pat. Off. | F23N 1/06 |
| 0279771 | 2/1988 | European Pat. Off. | F23N 1/04 |
| 0433965A1 | 12/1990 | European Pat. Off. | G05B 19/04 |
| 2547075 | 6/1983 | France | G05B 19/18 |
| 2662751 | 5/1991 | France | F04D 27/00 |
| 2056044 | 7/1980 | United Kingdom | F23N 1/06 |

*Primary Examiner*—William M. Shoop, Jr.
*Assistant Examiner*—Karen Masih
*Attorney, Agent, or Firm*—Ralph E. Krisher, Jr.

[57] ABSTRACT

A system and methods to provide a desired operating area for a motor driving a fan for inducing a draft in a vent of a heating, ventilating and air conditioning system. The motor includes a stationary assembly and a rotatable assembly. The stationary assembly includes windings adapted to be energized in at least one preselected sequence. The rotatable assembly is in magnetic coupling relation to the stationary assembly and in driving relation to the fan. The system includes a commutating circuit responsive to a pressure signal representative of a minimum air pressure in the vent and a tachometer signal representative of the speed of the motor for controlling power switching devices. The power switching devices selectively connect a power supply to the windings to provide a motor current to the windings in the preselected sequence to produce an electromagnetic field for rotating the rotatable assembly at a motor operating speed. A control circuit limits the motor current provided to the windings by the power switching devices to a predetermined maximum current which is a function of the motor operating speed as represented by the tachometer signal. In this manner, the control circuit inhibits operation of the motor outside a pre-defined speed/current region by preventing the motor current at a particular motor operating speed from exceeding the predetermined maximum current. The predetermined maximum current is within the pre-defined speed/current region and corresponds to the particular motor operating speed so that excessive heat is not generated by the system.

21 Claims, 10 Drawing Sheets

U.S. PATENT DOCUMENTS

| | | | |
|---|---|---|---|
| 4,500,821 | 2/1985 | Bitting et al. | 318/254 |
| 4,504,881 | 3/1985 | Wada et al. | 361/23 |
| 4,519,540 | 5/1985 | Bouelle et al. | 237/7 |
| 4,535,275 | 8/1985 | Muller | 318/254 |
| 4,540,921 | 9/1985 | Boyd, Jr. et al. | 318/254 |
| 4,544,868 | 10/1985 | Murty | 318/254 |
| 4,638,233 | 1/1987 | Erdman | 318/644 |
| 4,645,450 | 2/1987 | West | 431/12 |
| 4,648,551 | 3/1987 | Thompson et al. | 236/49 |
| 4,667,480 | 5/1987 | Bessler | 62/180 |
| 4,703,747 | 11/1987 | Thompson et al. | 126/112 |
| 4,707,650 | 11/1987 | Bose | 318/254 |
| 4,774,656 | 9/1988 | Quatse et al. | 364/900 |
| 4,806,833 | 2/1989 | Young | 318/335 |
| 4,818,924 | 4/1989 | Burney | 318/561 |
| 4,820,317 | 4/1989 | Fahey | 55/21 |
| 4,836,096 | 6/1989 | Avery | 98/34.5 |
| 4,858,676 | 8/1989 | Bolfik et al. | 165/2 |
| 4,860,231 | 8/1989 | Ballard et al. | 364/571.01 |
| 4,978,896 | 12/1990 | Shah | 318/254 |
| 5,019,757 | 5/1991 | Beifus | 318/254 |
| 5,075,608 | 12/1991 | Erdman et al. | 318/599 |
| 5,144,543 | 9/1992 | Striek et al. | 363/16 |
| 5,268,623 | 12/1993 | Muller | 318/254 |
| 5,373,205 | 12/1994 | Busick et al. | 318/434 |

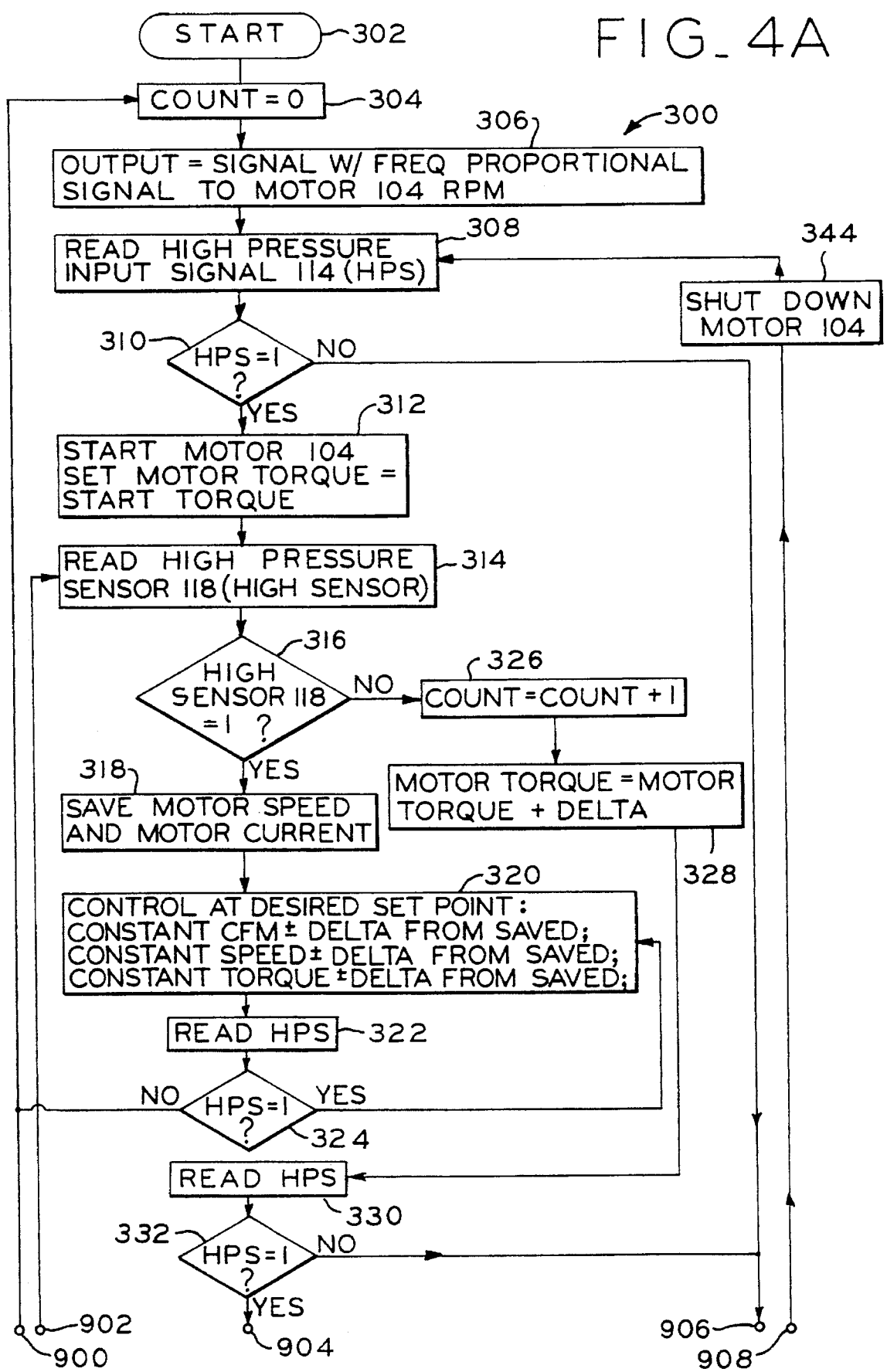
FIG_4A

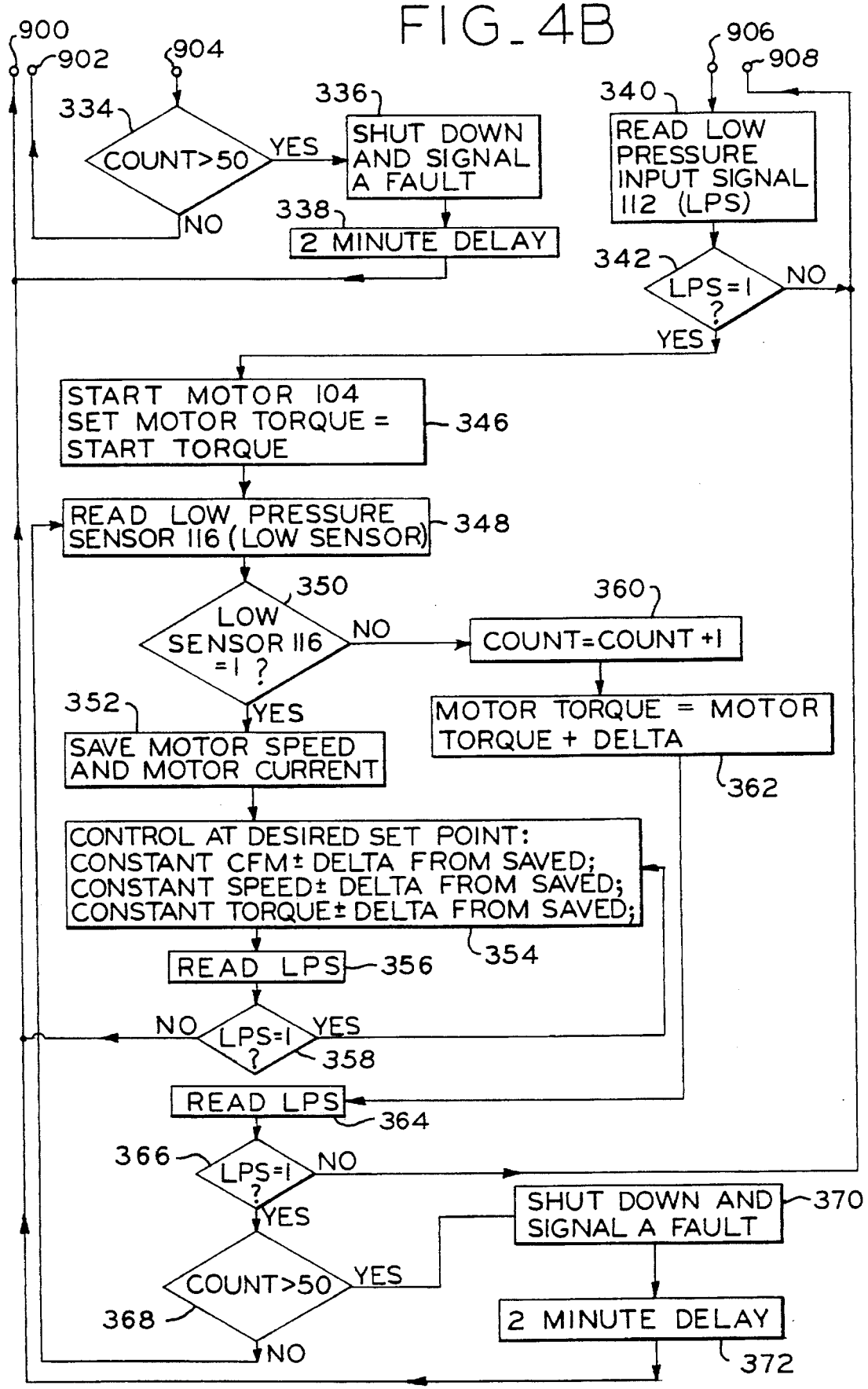
FIG_4B

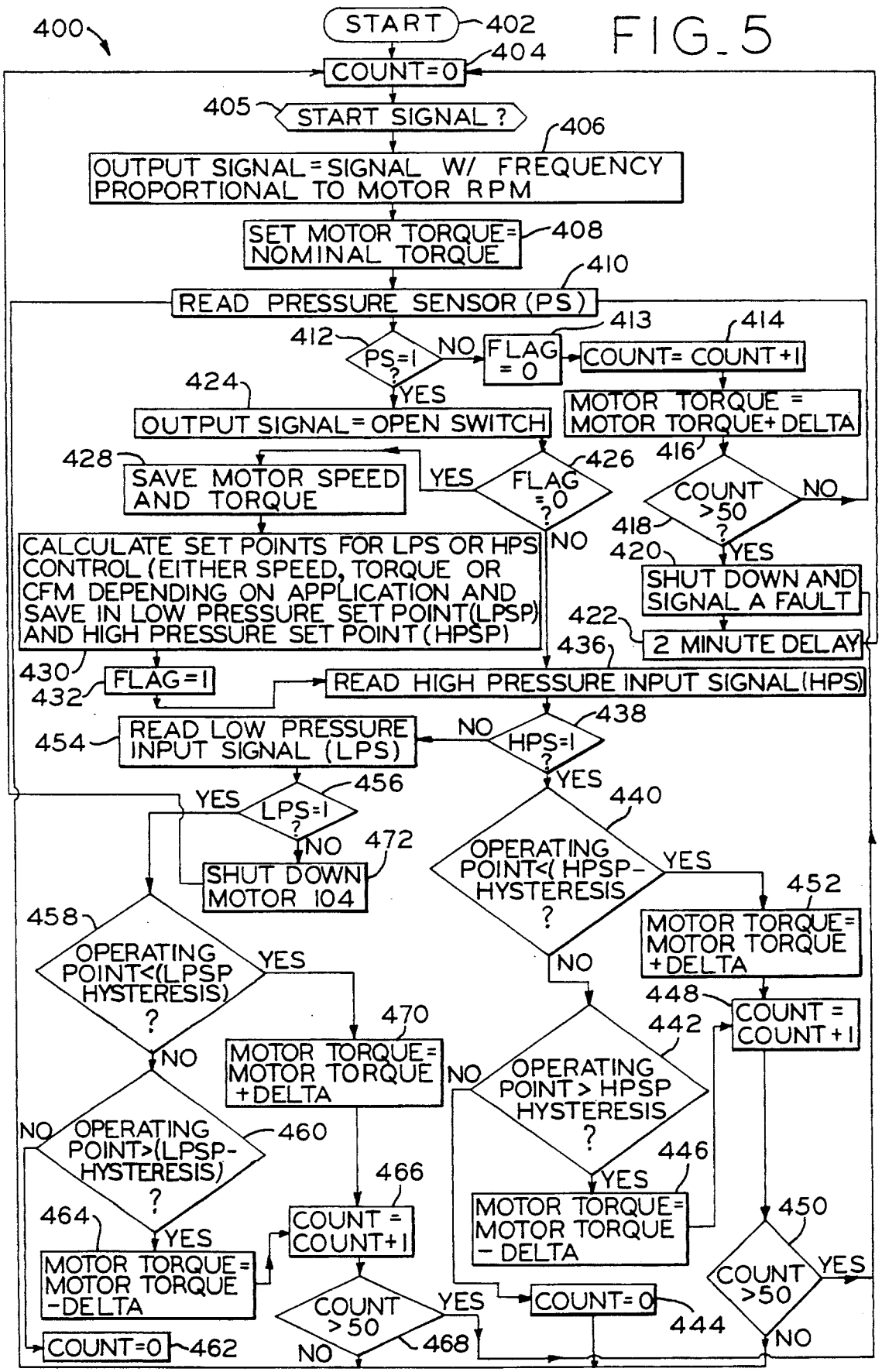
FIG_5

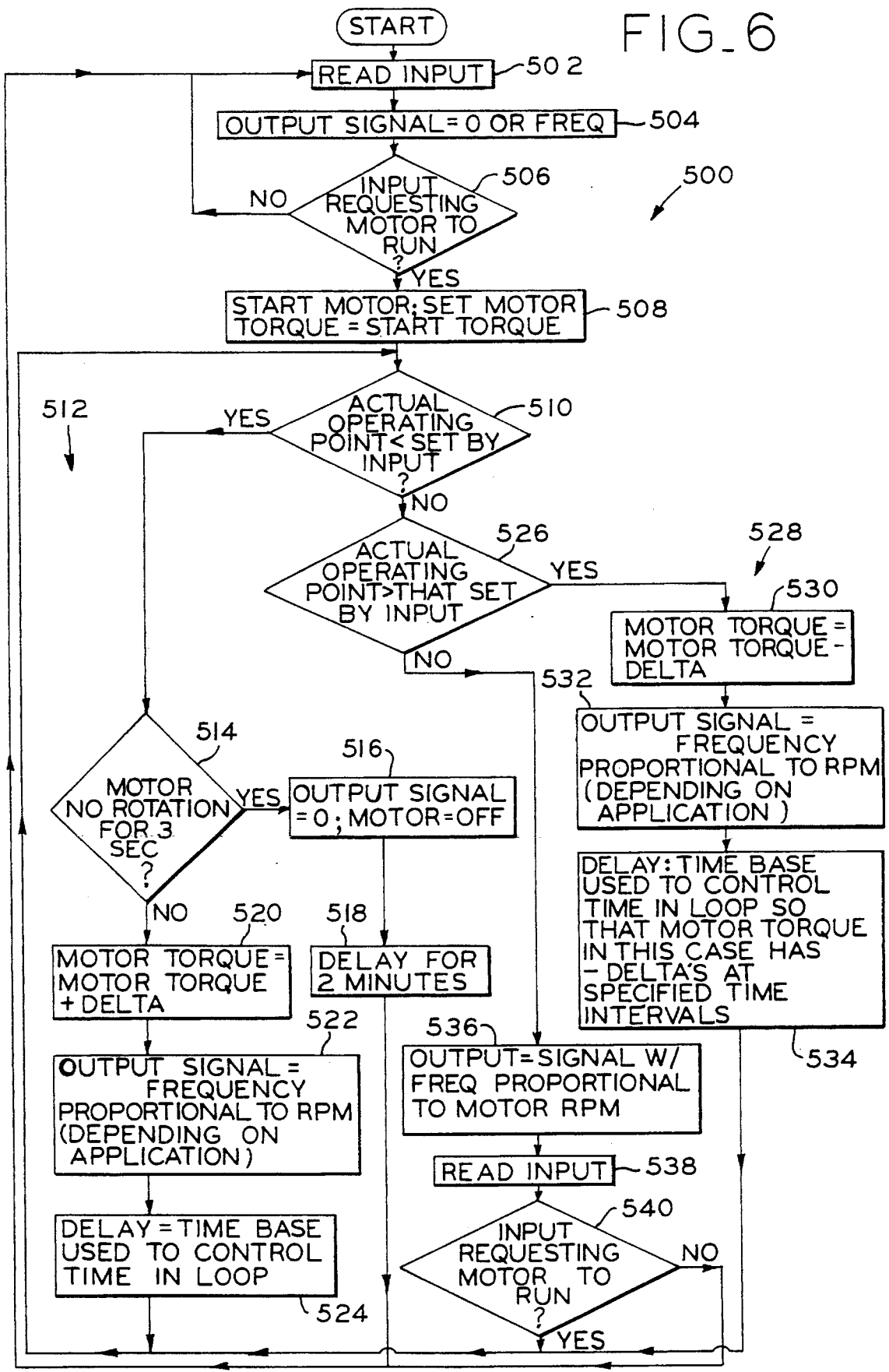
FIG_6

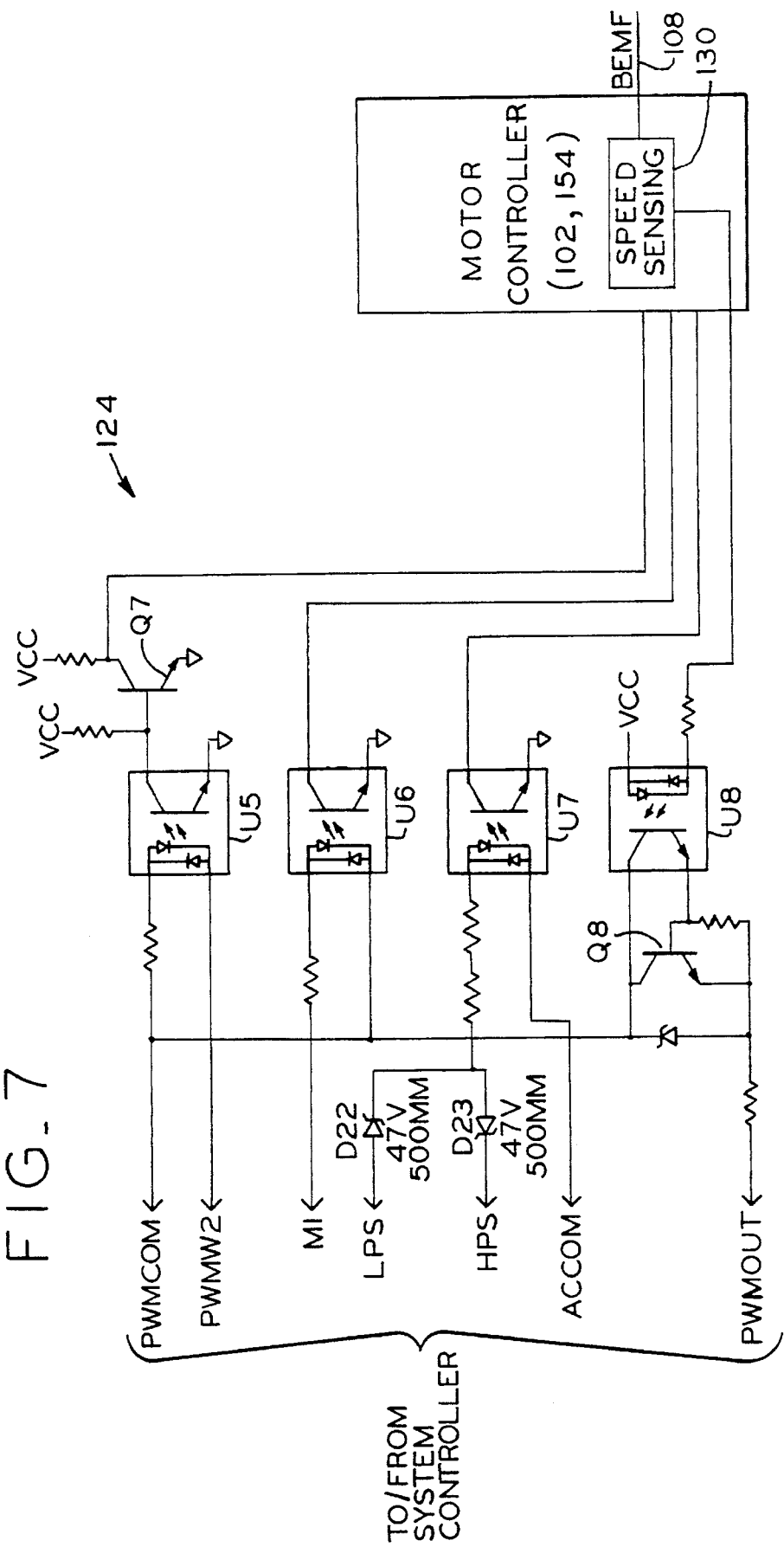
FIG_7

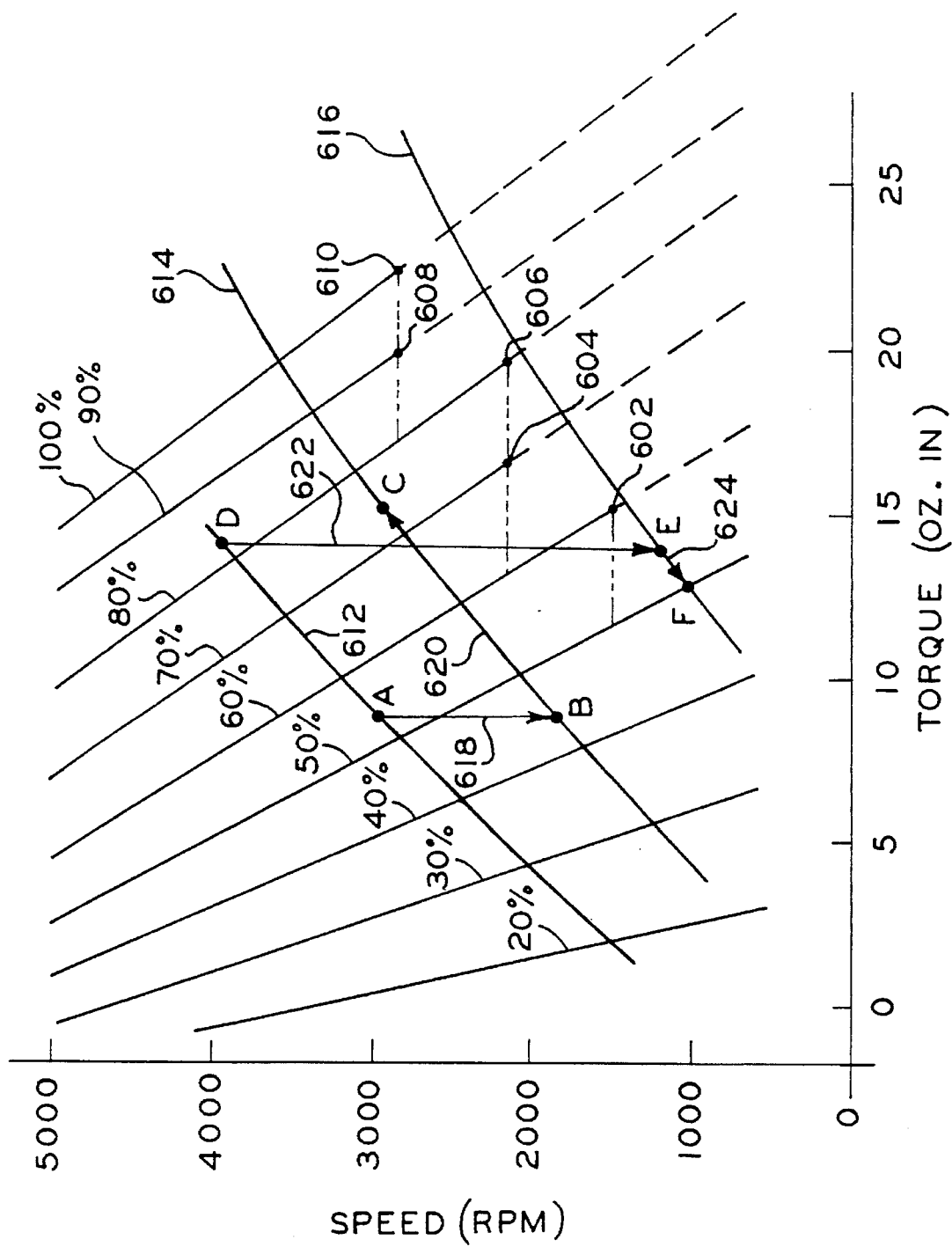
FIG_8

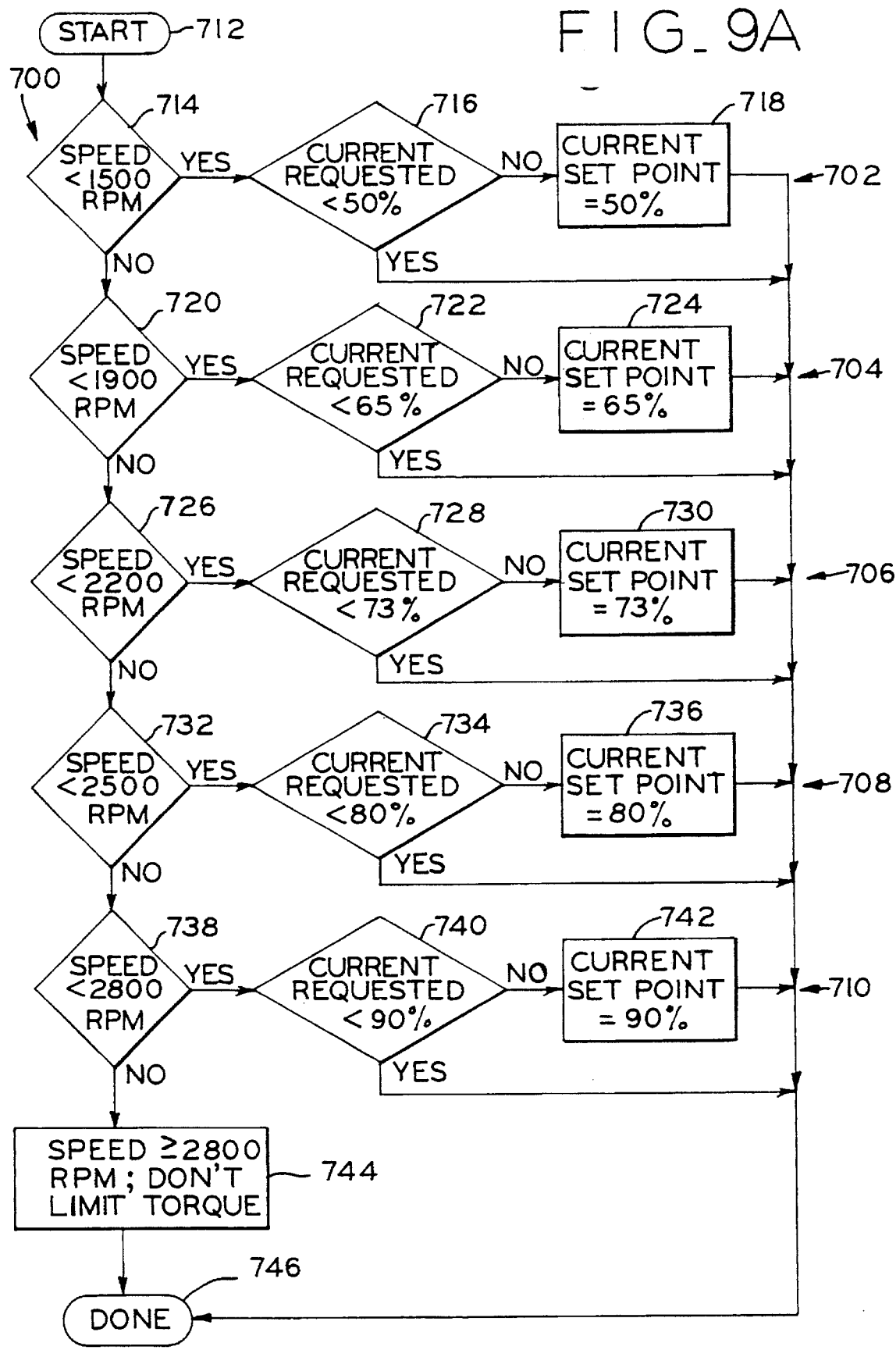
FIG_9A

SYSTEM AND METHODS FOR CONTROLLING A DRAFT INDUCER TO PROVIDE A DESIRED OPERATING AREA

CROSS-REFERENCE TO RELATED APPLICATION

This application is a continuation-in-part of the commonly assigned application Ser. No. 08/025,371 filed Feb. 26, 1993 now U.S. Pat. No. 5,418,438, the entire disclosure of which is incorporated herein by reference.

NOTICE

Copyright© 1994 General Electric Company. A portion of the disclosure of this patent document contains material which is subject to copyright protection. The copyright owner has no objection to the facsimile reproduction by anyone of the patent document or the patent disclosure, as it appears in the Patent and Trademark Office patent files or records, but otherwise reserves all copyright rights whatsoever.

BACKGROUND OF THE INVENTION

The invention generally relates to electronically controlled motors and, in particular, to a controller providing a desired operating area for a motor driving a fan for inducing a draft in an exhaust.

In a conventional furnace, natural convection currents carry away exhaust gases from the furnace's combustion chamber. However, the resultant loss of heat energy in the exhaust gases decreases the overall efficiency of the furnace. To improve furnace efficiency, heat exchangers are used to extract additional heat from the exhaust gases before they are vented to the atmosphere. Extracting heat from the exhaust gases, however, reduces the natural convection currents which would otherwise carry the gases away. One solution has been to use a draft inducing fan to exhaust the exhaust gases into the atmosphere.

Prior designs for a draft inducer control system controlling the exhaust of a furnace include a pressure transducer located in the vent adjacent the combustion chamber, a speed sensor for the motor and a torque sensor for the motor. These components vary the induced draft as a function of the sensed pressure in the combustion chamber. Such a control system, for example, is disclosed in commonly assigned U.S. Pat. No. 5,075,608, the entire disclosure of which is incorporated herein by reference.

Commonly assigned application Ser. No. 08/025,371 now U.S. Pat. No. 5,418,438, the entire disclosure of which is incorporated herein by reference, provides improvements in draft inducer systems which beneficially increase the efficiency of a furnace. For example, improvements which allow the speed/torque of the motor and the magnitude of the induced draft to be preselected for given operating conditions of the furnace increases efficiency by more closely matching the induced draft to the requirements of the furnace. Other improvements which allow this preselection to occur quickly and economically during manufacture or installation of the furnace and which provide greater versatility of the draft inducer control system in responding to various control signal conditions are also available.

While such systems represent improvements, further improvements in draft inducer control systems, draft inducer apparatus, and methods of control and operation are needed to beneficially provide an area of desired motor operation to minimize overheating in such systems. For example, a motor driving a draft inducer generally has the ability to provide relatively high torque at variable speeds. However, operation of the motor at relatively low speeds when torque is excessive, or under abnormal operating conditions, can result in increased operating temperatures. If the motor exceeds allowable operating temperatures, its electronic control can fail. While conventional motor systems provide various controls affecting motor speed, current and torque, such systems fail to provide adequate protection against the generation of excessive heat. Typically, motor systems limit the production of torque by their motors to a maximum torque independently of speed. Also, such systems may include an overcurrent or overspeed protection system which operates by preventing current flow to the motor or by disconnecting voltage from the motor. Although presently available systems provide for maximum torque control and control against overcurrent and overspeed conditions, there is a need for a motor system which maintains motor operation in a desired area with respect to motor speed/torque and which provides a maximum current limit as a function of motor speed.

SUMMARY OF THE INVENTION

Among the objects of the invention are to provide an improved motor system, an improved draft inducer apparatus and improved methods of control and operation which overcome at least some of the disadvantageous conditions described above; to provide an improved motor system, an improved draft inducer apparatus and improved methods of control and operation which maintain operation of a motor driving a rotatable component in a desired operating area with respect to motor speed and motor torque; to provide an improved motor system, an improved draft inducer apparatus and improved methods of control and operation which provide a maximum current limit which is a function of motor speed; to provide an improved motor system, an improved draft inducer apparatus and improved methods of control and operation which minimize overheating of the motor and its control such that the temperature of the electronic control does not exceed the level that may cause the electronic control to fail; and to provide an improved motor system, an improved draft inducer apparatus and improved methods of control and operation which are electrically efficient, reliable, economical and convenient to use.

Briefly described, a system embodying aspects of the present invention includes a motor having a stationary assembly and a rotatable assembly. The stationary assembly includes windings adapted to be energized in at least one preselected sequence. The rotatable assembly is in magnetic coupling relation to the stationary assembly and in driving relation to a rotatable component. The system includes a commutating circuit responsive to an external signal and a tachometer signal representative of the speed of the motor for controlling power switching devices. The power switching devices selectively connect a power supply to the windings to provide a motor current to the windings in the preselected sequence to produce an electromagnetic field for rotating the rotatable assembly at a motor operating speed. A control circuit limits the motor current provided to the windings by the power switching devices to a predetermined maximum current which is a function of the motor operating speed as represented by the tachometer signal. In this manner, the control circuit inhibits operation of the motor outside a pre-defined speed/current region by preventing the motor current at a particular motor operating speed from exceeding the predetermined maximum current. The predetermined maximum current is within the pre-defined speed/current region and corresponds to the particular motor operating speed so that excessive heat is not generated by the system.

Generally, another form of the invention is a method of operating a system for driving a rotatable component. The system includes a motor having a stationary assembly and a rotatable assembly. The stationary assembly includes windings adapted to be energized in at least one preselected sequence. The rotatable assembly is in magnetic coupling relation to the stationary assembly and in driving relation to a rotatable component. The method comprises the step of controlling power switching devices in response to an external signal and a tachometer signal representative of the speed of the motor for selectively connecting a power supply to the windings. By selectively connecting the power supply, the power switching devices provide a motor current to the windings in the preselected sequence to produce an electromagnetic field for rotating the rotatable assembly at a motor operating speed. The method further comprises the step of limiting the motor current provided to the windings by the power switching devices to a predetermined maximum current which is a function of the motor operating speed as represented by the tachometer signal. Operating the system according to the method inhibits operation of the motor outside a pre-defined speed/current region by preventing the motor current at a particular motor operating speed from exceeding the predetermined maximum current. The predetermined maximum current is within the pre-defined speed/current region and corresponds to the particular motor operating speed so that excessive heat is not generated by the system.

Other objects and features will be in part apparent and in part pointed out hereinafter.

BRIEF DESCRIPTION OF THE DRAWINGS

FIGS. 4A and 4B are a flow chart illustrating one preferred embodiment of the operation of the control circuit of FIG. 1.

FIG. 5 is a flow chart illustrating one preferred embodiment of the operation of the control circuit of FIG. 2.

FIG. 6 is a flow chart illustrating one preferred embodiment of the operation of the control circuit of FIG. 3.

FIG. 7 is a circuit diagram of one preferred embodiment of the interface including optoisolators and wherein the interface receives the pressure sensor signals and the pressure select input signals.

FIG. 8 illustrates exemplary speed vs. torque curves defining a desired operating area for a motor driving a draft inducer fan according to the invention.

FIGS. 9A and 9B are flow charts illustrating preferred embodiments of the operation of the control circuit of FIG. 1, 2 or 3 for providing a desired operating area according to the invention.

Corresponding reference characters indicate corresponding parts throughout the drawings.

DETAILED DESCRIPTION OF THE PREFERRED EMBODIMENTS

Figure 1:
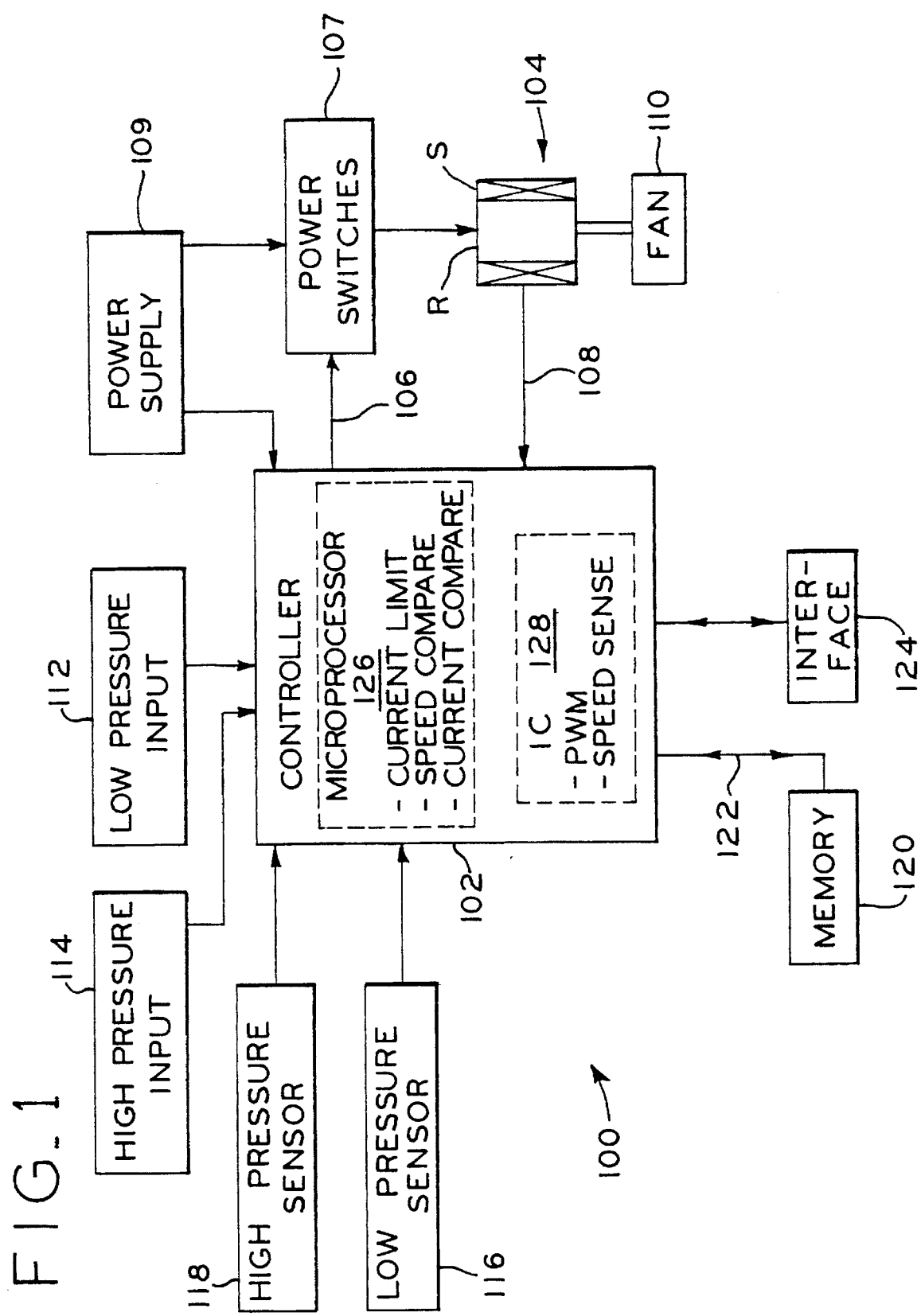
FIG. 1 is a block diagram of a control circuit of the invention including two pressure sensors and two pressure select inputs.

Referring now to FIG. 1, one preferred embodiment of a control circuit 100 for any electronically controllable motor is shown. Such motors include single and variable speed motors, selectable speed motors having a plurality of finite, discrete speeds and brushless DC motors, including electronically commutated motors and switched reluctance motors. In the illustrated embodiment, the control circuit 100 includes a controller 102 which is connected to a motor 104. The motor 104 is preferably a draft inducer variable speed motor such as the single phase motor described in the copending, coassigned application Ser. No. 08/023,790, the entire disclosure of which is incorporated herein by reference. The controller 102 is preferably mounted within a housing (not shown) of motor 104. Controller 102 sends control commands to motor 104 in the form of a motor control signal via a line 106 to a set of power switches 107 and receives speed or torque feedback from motor 104 via a line 108. In a preferred embodiment, motor 104 has a stationary assembly S and a rotatable assembly R in magnetic coupling relation to the stationary assembly. The stationary assembly includes windings adapted to be energized in at least one preselected sequence. The power switches 107, responsive to the control commands at line 106, selectively connect a power supply 109 to the windings of motor 104 to provide current to the windings in the preselected sequence to produce an electromagnetic field for rotating the rotatable assembly. The rotatable assembly of motor 104 is coupled to a rotatable component, such as a fan 110, for inducing a draft in a vent (not shown) of a conventional heating, ventilating, and air conditioning (HVAC) system.

Controller 102 is connected to a low pressure input 112 and a high pressure input 114. Inputs 112 and 114 indicate to controller 102 whether a low draft or a high draft is needed in the vent. In one embodiment, the inputs 112 and 114 take the form of manual switches.

Controller 102 is also connected to a low pressure sensor 116 and to a high pressure sensor 118. The pressure sensors 116 and 118 are in an open or closed condition depending on whether the air pressure in the vent exceeds a preset level for each of the sensors. In the alternative, sensors 116 and 118 may be variable pressure sensors which output a signal having a variable frequency, amplitude, duty cycle or like characteristic as a function of the sensed pressure in the vent. The air pressure in the vent increases as the draft induced by the fan 110 increases. Controller 102 is also connected to a memory 120 for storing and retrieving data via a line 122.

Controller 102 outputs a control signal via interface 124. The control signal may take the form of an isolated transistor switch closure with the following functions: (1) when motor 104 is in the starting mode and pressure sensors 116 and 118 are open so that the draft induced in the vent is below the requested CFM level and the pressure is below the requested pressure, the control signal from the interface 124 is an alternating current signal having a frequency proportional to the RPM of motor 104; (2) when motor 104 is in a locked rotor condition, the control signal from interface 124 represents a closed switch condition; (3) when low pressure sensor 116 is closed, the control signal from interface 124 represents an open switch condition; and (4) when the requested pressure level is not achieved in the vent within a specified time, the control signal from interface 124 represents a closed switch condition, thereby overriding the open switch condition caused by the opening of low pressure switch 116. Alternatively, depending on design requirements, the control signal may be an AC signal have a frequency corresponding to the RPM of motor 104 inside of the operating range and open switch to signal a fault outside of the operating range.

The main controller for the HVAC system may also be used to automatically control inputs 112 and 114 via interface 124 as an alternative to using manual switches.

During operation when there is no input signal from inputs 112 and 114, controller 102 removes all electrical power from motor 104. When low pressure input 112 signals controller 102, controller 102 increases the speed/torque of motor 104 at a first preset rate until the draft induced by fan 110 causes low pressure sensor 116 to close. Closure of sensor 116 indicates that the pressure in the vent is greater than the preset level for sensor 116. Similarly, controller 102 decreases the speed/torque of motor 104 at a second preset rate when the sensed pressure in the vent rises above the preset level for sensor 116. Controller 102 thereafter maintains the speed/torque of motor 104 sufficient to keep low pressure sensor 116 closed. This is accomplished through use of conventional algorithms to set the CFM through the vent or the speed of motor 104 as a function of the motor speed and motor current at which sensor 116 first closes.

When controller 102 receives a signal from high pressure input 114, it increases the speed/torque of motor 104 at the first preset rate until fan 110 induces a draft in the vent sufficient to close high pressure sensor 118. Closure of sensor 118 indicates that the pressure in the vent is greater than the preset level for sensor 118. Similarly, controller 102 decreases the speed/torque of motor 104 at the second preset rate when the sensed pressure in the vent rises above the preset level for sensor 118. Controller 102 thereafter maintains the speed/torque of motor 104 sufficient to keep high pressure sensor 118 closed. Again, this is accomplished through use of conventional algorithms to set the CFM through the vent or the speed of motor 104 as a function of the motor speed and motor current at which sensor 116 first closes.

If controller 102 simultaneously senses a signal from inputs 112 and 114, the controller 102 sends an error signal via interface 124 to indicate to the main control of the HVAC system that an error has occurred. Controller 102 will attempt to restart motor 104 if the error condition is removed and one of the two inputs 112 and 114 signals is active. It will be seen within the above that the operating points of control circuit 100 can be advantageously changed during manufacture or installation of the furnace by simply replacing pressure sensors 116 and 118 with pressure sensors having different preset pressure levels.

Figure 2:
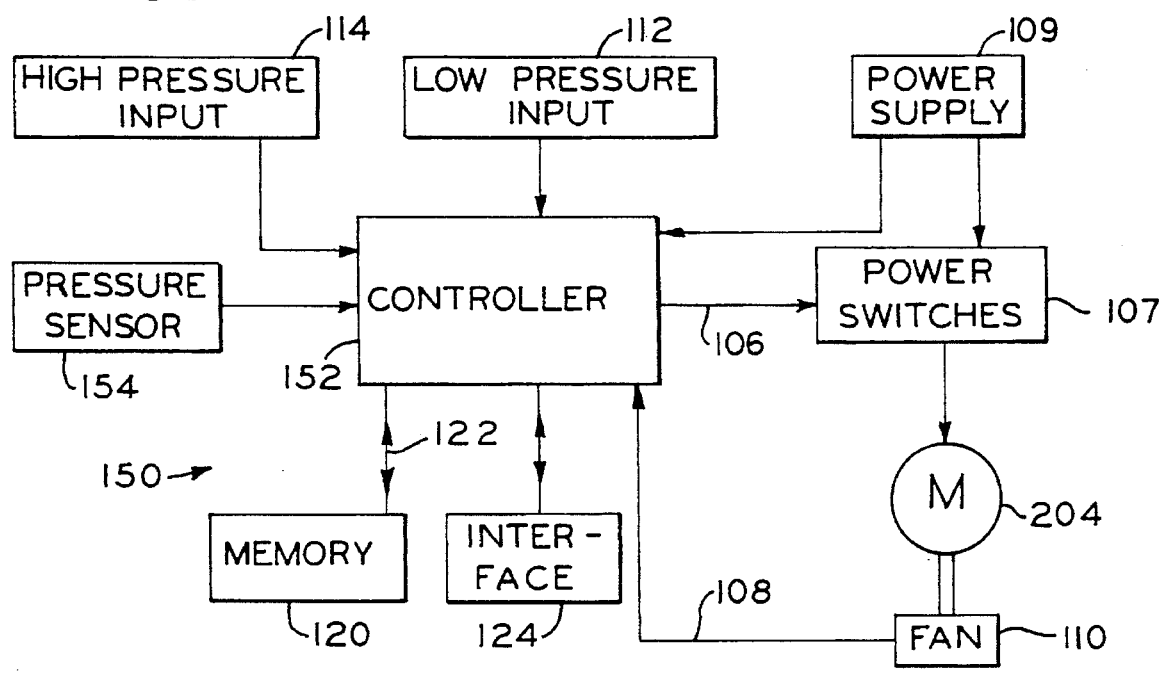
FIG. 2 is a block diagram of a control circuit of the invention including one pressure sensor and two pressure select inputs.

FIG. 2 shows another preferred embodiment of the invention in a circuit 150. Circuit 150 is similar to circuit 100 of FIG. 1 with the exception that a single pressure sensor 154 in circuit 150 replaces pressure sensors 116 and 118 in circuit 100. Accordingly, circuit 150 includes a controller 152 for controlling motor 104 with only a single pressure sensor. Again, controller 152 is preferably mounted within the housing of motor 104.

In operation, controller 152 turns off motor 104 when no signal is present from inputs 112 and 114. When controller 152 senses a signal from low pressure input 112, controller 152 increases the speed/torque of motor 104 at a first preset rate until the draft induced by fan 110 creates sufficient pressure to close pressure sensor 154. Closure of sensor 154 indicates that the pressure in the vent is greater than the preset level for sensor 154. Similarly, controller 152 decreases the speed/torque of motor 104 at a second preset rate when the sensed pressure in the vent rises above the preset level for sensor 154. Controller 152 thereafter maintains the speed/torque of motor 104 sufficient to keep pressure sensor 154 closed. When controller 152 senses a signal from high pressure input 114, controller 152 increases the speed/torque of motor 104 by a fixed amount above the point of operation for the low pressure mode. The output signals sent via interface 124 by controller 152 during operation correspond to the signals sent by controller 102 via interface 124 in FIG. 1. It will be seen within the above that the operating points of control circuit 150 can be advantageously changed during manufacture or installation of the furnace by simply replacing pressure sensor 154 with a pressure sensor having a different preset pressure level.

Figure 3:
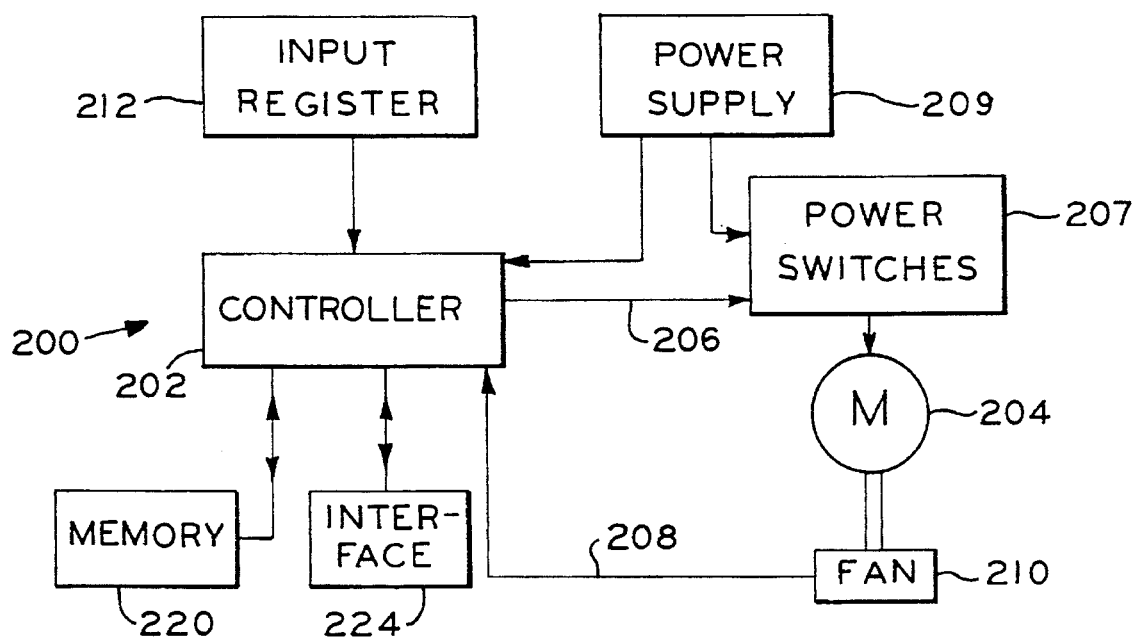
FIG. 3 is a block diagram of a control circuit of the invention including a register providing the pressure select inputs.

FIG. 3 shows a circuit 200 comprising yet another preferred embodiment of the invention. Circuit 200 includes a controller 202 connected to a motor 204. Controller 202 sends control commands to the motor 204 via a line 206 to a set of power switches 207 and receives speed or torque feedback from motor 204 via a line 208. The power switches 207, responsive to the control commands at line 206, selectively connect a power supply 209 to the windings of motor 204 to provide current to the windings in the preselected sequence to produce an electromagnetic field for rotating the rotatable assembly. Motor 204 is coupled to a fan 210 for inducing a draft in a vent (not shown) of a heating, ventilating and air conditioning system. Controller 202 receives an input signal from an input register 212 which may, for example, take the form of a manual switch. Controller 202 is also connected to a memory 220 for storing and recalling pertinent data. Controller 202 is also connected to an interface 224 for sending/receiving signals to/from the main control of the HVAC system.

In operation, controller 202 receives a signal from input register 212 corresponding to a predetermined speed/torque setting for motor 204. Controller 202 responds to the input signal by controlling motor 204 to operate at the predetermined speed/torque level. For example, input register 212 may input one of two signals corresponding to high heat or low heat to cause motor 204 and fan 210 to induce a draft at one of two different constant CFM air flows which are optimum for high heat and low heat, respectively. Alternatively, input register 212 may output one of a plurality of signals corresponding to a plurality of CFM air flows for various operating conditions. The output signal sent by controller 202 via interface 224 is an isolated transistor switch closure which occurs when motor 204 does not achieve the requested speed/torque level corresponding to the requested CFM level in a predetermined period of time. During normal operation, the isolated transistor of interface 224 remains open.

For each of circuits 100, 150, and 200 in FIGS. 1–3, the respective controllers 102, 152, and 202 may receive commands via interfaces 124, 124 and 224 from the main controller for the HVAC system. Accordingly, controllers 102, 152, and 202 may be operated in a slave mode whereby control is largely passed to the main controller for the HVAC system or may be operated autonomously. When an error is detected, for example, because motor 104 or 204 failed to reach the operating speed/torque within a predetermined period of time or because the induced draft failed to create adequate pressure in the vent within a predetermined period of time, the respective controller 102, 152, or 202 may shut down the associated motor 104, 104 or 204. In the autonomous mode, the respective controller may attempt to restart the respective motor within a predetermined period of time, such as two minutes. In the slave mode, the respective controller may wait for a signal from the main controller of the HVAC system before attempting to restart the motor 104, 104 or 204. It is also contemplated within the scope of the invention that the main controller in the HVAC system (not shown) sends control signals via interfaces 124, 124, and 224 to controllers 102, 152, and 202, respectively, in place of the input signals provided by inputs 112/114, 112/114, and 212. The main controllers thereby control the CFM airflows and pressures in the vents of the HVAC system.

FIGS. 4–6 show flow charts for operating the controllers 102, 152 and 202 of FIGS. 1–3. As shown in commonly assigned U.S. Pat. No. 5,075,608, the entire disclosure of which is incorporated herein by reference, in one preferred embodiment of the invention, controllers 102, 152, and 202 include a microprocessor 126 which operates in combination with an integrated circuit (IC) 128 (see FIG. 1) for performing the operations of the flow charts of FIGS. 4–6. In each of FIGS. 4–6, terminals referred to by a matching 900 series number are assumed to be connected together from one figure to the next without further discussion.

FIGS. 4A and 4B show a flow chart 300 for operating controller 102 of FIG. 1. Flow chart 300 begins at a start step 302. Controller 102 sets a count variable equal to zero in a step 304. In a step 306, controller 102 sends an output signal via interface 124 which comprises a signal having a frequency proportional to the speed/torque of motor 104. Controller 102 reads the high pressure input signal (HPS) from high pressure input 114 in a step 308. Controller 102 tests whether the high pressure input signal is on or off in a step 310. The high pressure input signal takes the form of a logical input. If the voltage of the high pressure input signal is high corresponding to a logic level ONE, then high pressure input 114 is considered to be requesting high pressure. If the high pressure input signal is a low voltage corresponding to a logic level ZERO, then controller 102 deems that high pressure input 114 is not requesting high pressure.

Accordingly, if controller 102 determines that the high pressure input signal is a logic level ONE in step 310, then controller 102 starts motor 104 and sets the motor speed/torque variable equal to the start speed/torque value stored in memory 120 in a step 312. If start-up procedures peculiar to the particular type of motor used for motor 104 are required, there are implemented by controller 102 before it proceeds to another step. Controller 102 then reads high pressure sensor 118 in a step 314 and tests whether high pressure sensor 118 is closed in a step 316. If sensor 118 is closed, controller 102 saves the motor speed and motor current settings in memory 120 in a step 318. Controller 102 then proceeds to a step 320 where it controls motor 104 at the desired set point to keep sensor 118 closed. Controller 102 102 thereby maintains a constant CFM draft in the vent of the HVAC system within a tolerance of ±delta from the stored value. Depending on the design requirements, controller 102 could also maintain motor 104 at a constant RPM ±delta from the stored value or maintain motor 104 at a constant torque ±delta from the stored value. Controller 102 reads the high pressure input signal from high pressure input 114 in a step 322. Controller 102 tests whether a high pressure input signal is present at a step 324. If the high pressure input signal is present, controller 102 returns to step 320. If the signal is not present, controller 102 returns to step 304.

Returning to step 316, if controller 102 senses that high pressure sensor 118 is not closed in step 316, controller 102 increments the count variable by one in a step 326. Controller 102 increments the motor speed/torque variable by delta in a step 328 and then proceeds to step 330 where controller 102 reads the high pressure input signal from high pressure input 114. Controller 102 tests whether the high pressure sensor is closed in a step 332. If it is closed, controller 102 proceeds to a step 334 where it tests whether the count variable is greater than 50. If the count variable is not greater than 50 in step 334, controller 102 returns back to step 314. If the count variable is greater than 50 in step 334, then controller 102 proceeds to a step 336 where it shuts down power to motor 104 and outputs a fault signal via interface 124. Controller 102 proceeds to a step 338 and times out a two minute delay whereafter it returns to step 304 to attempt to restart motor 104.

Returning to steps 310 and 332, if controller 102 determines in either step that the high pressure input 114 was not a logic level ONE indicating that high pressure was requested, then controller 102 proceeds to a step 340 where it reads the low pressure input signal from low pressure input 112. If controller 102 determines in a step 342 that the low pressure input signal from low pressure input 112 is also not present, then controller 102 returns to a step 344 where it shuts down motor 104. Controller 102 then proceeds to step 308 to again determine whether a high pressure input signal is present from high pressure input 114. Controller 102 cycles back and forth reading the signals from inputs 112 and 114 in this manner until an input is detected indicating that motor 104 is to be energized.

If controller 102 determines in step 342 that the low pressure input signal is present at low pressure input 112, then controller 102 starts motor 104 and sets the motor speed/torque variable equal to the start speed/torque value stored in memory 120 in a step 346. If start-up procedures peculiar to the particular type of motor used for motor 104 are required, there are implemented by controller 102 before it proceeds to another step. Controller 102 then reads the low pressure input signal from low pressure sensor 116 in a step 348. Controller 102 tests whether the low pressure sensor 116 is closed in a step 350. If sensor 116 is closed, controller 102 saves the motor speed and motor current settings in memory 120 in a step 352. Controller 102 then proceeds to a step 354 where it controls motor 104 at the desired set point to keep sensor 116 closed. Controller 102 thereby maintains a constant CFM draft in the vent of the HVAC system within a tolerance of ±delta from the stored value. Depending on the design requirements, controller 102 could also maintain motor 104 at a constant RPM ±delta from the stored value or maintain motor 104 at a constant torque ±delta from the stored value. Controller 102 reads the low pressure input in a step 356. Controller 102 tests whether a low pressure input signal (LPS) is present at a step 358. If the low pressure input signal is present, controller 102 returns to step 354. If the signal is not present, controller 102 returns to step 304.

Returning to step 350, if controller 102 determines that low pressure sensor 116 was not closed in step 350, then controller 102 increments the count variable by one in a step 360. Controller 102 increments the motor speed/torque variable by delta in a step 362 and reads the low pressure input 112 in a step 364. If controller 102 determines that low pressure has been signalled by low pressure input 112 in a step 366, then controller 102 proceeds to a step 368 where it determines whether the count variable is greater than 50. If the count variable is not greater than 50, then controller 102 returns to step 348. If the count variable is greater than 50, then controller 102 proceeds to a step 370 where it shuts down all power to motor 104 and outputs a fault signal via interface 124. Controller 102 times out a two minutes delay in a step 372. Controller 102 then returns to step 304.

Returning to step 366, if controller 102 determines that there was no signal from low pressure input 112 in step 366, then controller 102 returns to step 344 to shut down motor 104. Controller 102 then proceeds to step 308 to determine whether high pressure has been requested.

FIG. 5 shows a flow chart 400 for operating controller 152 of FIG. 2. Flow chart 400 begins at a start step 402. Controller 152 sets a variable labelled count equal to zero in step 404. Controller 152 thereafter waits for a start signal in step 405. The start signal may be generated by the main controller for the HVAC system and indicates that motor 104 should be started. During the period when motor 104 is being started, controller 152 outputs a signal having a frequency proportional to the speed/torque of motor 104 in a step 406 via interface 124. Controller 152 sets a variable labelled "motor speed/torque" equal to a nominal speed/torque value stored in memory 120 in a step 408. If start-up procedures peculiar to the particular type of motor used for motor 104 are required, there are implemented by controller 152 before it proceeds to another step. The variable "motor speed/torque" is used by controller 152 in setting the speed/torque of motor 104. Controller 152 reads pressure sensor 154 in a step 410. If controller 152 determines via a step 412 that pressure sensor 154 is not closed, then controller 152 sets a variable labelled "flag" equal to zero in a step 413 and increments the count variable by one in a step 414. Controller 152 increments the motor speed/torque variable by delta in a step 416. Controller 152 tests whether the count variable is greater than 50 in a step 418. If the count variable is not greater than 50, then controller 152 returns to step 410. If the count variable is greater than 50, indicating that too much time has been taken for motor 104 to reach its full load operating condition, then controller 152 turns off all power to motor 104 and signals a fault via interface 124 in a step 420. Controller 152 then times out a two minute delay in a step 422 before returning to step 404 to attempt to restart motor 104 another time.

Returning to step 412, if controller 152 determines that pressure sensor 154 is closed in step 412, then controller 152 outputs an open switch signal via interface 124 in a step 424. Controller 152 tests whether the flag variable is equal to zero in a step 426. If the flag variable equals zero, it means that this is the first time that the pressure sensor 154 has closed. The operating parameters occurring at this time indicate the duct loading. Accordingly, controller 152 saves the motor speed data and torque/current for the motor in a step 428.

The controller now knows the motor speed, motor torque/current, and related CFM through the vent in which pressure sensor 154 is located. From this data, controller 152 calculates and stores the operating set points for motor 104 in a step 430 which correspond to: (1) the low pressure/low CFM setting (LPS) which is stored in memory 120 as the low pressure set point (LPSP); and (2) the high pressure/high CFM setting (HPS) which is stored in memory 120 as the high pressure set point (HPSP). The LPSP and HPSP can be calculated and stored as a function of speed, torque, or CFM depending on the application. The operating point at which pressure sensor 154 is first set to close (and therefore the operating point where the data for calculating the LPSP and HPSP is collected in step 428) can be set to correspond to the LPSP or the HPSP. It has been found preferable, however, to choose the data collection point midway between LPSP and HPSP so that the error in calculating each is roughly divided between them. Finally, for furnaces having combustion chambers which require more than two draft levels during operation, step 430 can be expanded to have controller 152 calculate and store additional set points for the additional draft levels. The flag variable is set equal to one in a step 432 so that the set points are calculated one time for a given start-up. If it is found desirable to recalculate the set points after start-up, flow chart 400 can be changed to access steps 428 and 430 at the appropriate times.

After step 432 or if the flag variable is not equal to zero in step 426, controller 152 reads the high pressure input in a step 436. Controller 152 tests whether the high pressure signal is present in a step 438. If the high pressure signal is present, controller 152 tests whether the current operating point of motor 104 is less than HPSP in a step 440. In performing this test, HPSP is broadened by a hysteresis variable which enlarges the range of acceptable operating points for which controller 152 will make no change in the operating parameters for motor 104. If the current operating point is not less than HPSP in step 440, then controller 152 tests whether the current operating point is greater than HPSP/hysteresis in a step 442. If the current operating point is not greater than HPSP in step 442, then controller 152 sets the count variable equal to zero in step 444 and returns to step 410. If the current operating point is greater than HPSP in step 442, then controller 152 decreases the motor torque by delta in a step 446 and increments the count by one in a step 448. Controller 152 then tests whether the count variable is greater than 50 in a step 450. If it is, controller 152 returns to step 420. If it is not, controller 152 returns to step 410. Finally, in step 440, if controller 152 determines that the current operating point is less than HPSP, then controller 152 increases the motor torque by delta in a step 452 before proceeding to step 448.

Returning to step 438, if controller 152 determines that there was no high pressure input signal in step 438, then it reads the low pressure input (LPS) from low pressure input 112 in a step 454. Controller 152 tests whether the low pressure signal is present in a step 456. If the low pressure signal is present, controller 152 tests whether the current operating point of motor 104 is less than LPSP in a step 458. In performing this test, as above, LPSP is broadened by a hysteresis variable which enlarges the range of acceptable operating points for which controller 152 will make no change in the operating parameters for motor 104. If the current operating point is not less than LPSP in step 458, then controller 152 tests whether the current operating point is greater than LPSP/hysteresis in a step 460. If the current operating point is not greater than LPSP in step 460, then controller 152 sets the count variable equal to zero in step 462 and returns to step 410. If the current operating point is greater than LPSP in step 460, then controller 152 decreases the motor torque by delta in a step 464 and increments the count by one in a step 466. Controller 152 then tests whether the count variable is greater than 50 in a step 468. If it is, controller 152 returns to step 420. If it is not, controller 152 returns to step 410. Finally, in step 458, if controller 152 determines that the current operating point is less than LPSP, then controller 152 increases the motor torque by delta in a step 470 before proceeding to step 466. Finally, in step 456, if controller 152 determines that the low pressure signal is not present, it shuts off power to motor 104 in a step 472 and returns to step 404.

In the block diagrams illustrated in FIGS. 1 and 2, the control circuit of the invention is illustrated such that the controller 102, 152 receives a signal directly indicating the desired pressure level. It is also contemplated that the control circuit of the invention may operate such that the controller would be responsive to signals provided via an optoisolator interface 124, shown in FIG. 7. In particular, interface 124 would be located between the system controller and the motor controller 102, 152, such as a motor controller for a single phase motor as described in co-assigned Ser. No. 08/023,790 filed Feb. 22, 1993, the entire disclosure of which is incorporated herein by reference. In general, it is contemplated that controller 102, 152 may operate in a proportional torque mode or in a pressure switch mode. In either mode, a 12 VDC signal is applied to a terminal PWMCOM.

During operation in the proportional torque mode, a terminal PWMW2 provides a signal having a duty cycle corresponding to the percent of desired torque. In response, optocoupler U5 would selectively close a transistor switch Q7 to provide a corresponding pulse width modulated signal to the motor controller.

During operation in a pressure switch mode, a terminal W1 provides the low pressure command signal. In particular, terminal W1 is grounded actuating optocoupler U6 to provide a low pressure select signal to the motor controller. A terminal LPS from the low pressure sensor, which provides a 24 volt, 60 Hz ac signal, conducts a positive half wave via diode D22 to intermittently turn on optocoupler U7 to indicate that the low pressure level has been attained and to control a constant CFM based on the low pressure sensor. A terminal PWMW2 provides the high pressure command signal. In particular, terminal PWMW2 is grounded actuating optocoupler U5 to provide a high pressure select signal to the motor controller. A terminal HPS from the high pressure sensor, which provides a 24 volt, 60 Hz ac signal, conducts a negative half wave via diode D23. As a result, when the high pressure is reached, a full wave ac signal is provided by the combination of the positive going half wave provided by terminal LPS via diode D22 and the negative half wave provided by terminal HPS via diode D23 so that optocoupler U7 is constantly on to indicate that the high pressure level has been attained and to control a constant CFM based on the high pressure sensor.

Alternatively, when no proportional torque mode is required, only terminals W1 and PWMW2 are necessary to provide information to the motor controller to indicate low pressure or high pressure operation. In the low pressure mode, terminal W1 is grounded to activate optocoupler U6 and terminal PWMW2 is open circuited so that optocoupler U5 is inactive. This results in a low pressure constant CFM mode. For high pressure operation, both terminals W1 and PWMW2 are grounded to activate both optocouplers U5 and U6 to provide both signals to the motor controller. Effectively, the PWMW2 terminal is an override terminal providing a signal which, when present results in high pressure constant CFM operation. Terminal ACCOM is an alternating current common terminal providing a ground to the AC signals applied to terminals LPS and HPS. An optional terminal PWMOUT may be used to provide a tachometer signal to the system controller in which case optocoupler U8 selectively turns on and off a transistor Q8 to generate the tachometer signal. A speed sensing circuit 130, which is part of IC 128 of controller 102, 152, generates a signal representative of the speed of motor 104. The signal generated by speed sensing circuit 130 is a function of the back emf information via line 108 from motor 104 and is provided to optocoupler U8 for generating the tachometer signal.

FIG. 6 shows a flow chart 500 for operating controller 202 of FIG. 3. Flow chart 500 begins at step 502 at which point controller 202 reads the input which indicates the desired pressure level. For example, the input may be an input register 202 as illustrated in FIG. 3. Alternatively, the input may be low and high pressure signals, a run point, or a duty cycle signal which generates the register information. Next, an output signal value provided to the system controller is set equal to zero or provided with a frequency proportional to RPMs, depending on the application, at step 504. At step 506, the controller returns to step 502 if no input requesting motor operation has been received. If a motor operation request has been received, the controller proceeds to step 508 wherein the motor starting sequence is initiated based on motor starting parameters which are stored in memory. Generally, current is ramped upward to a given point to provide a soft start of the motor.

At step 510, the controller compares the actual operating parameters of the motor to the parameters set by the input read from step 502. The operating point may be speed, torque, or constant cubic feet per minute operation (CFM). CFM operation may depend on torque and speed such as disclosed in U.S. Pat. Nos. 4,806,833, 4,978,896 or 5,019,757, the entire disclosures of which are incorporated herein by reference. When the actual operating point is less than the point set by the input, the controller operates within loop 512 to increase torque until the actual operating point is equal to or greater than the set point. Loop 512 begins with step 514 wherein the controller looks for motor rotation. If there is no rotation within 3 seconds, loop 512 is terminated, step 516 is executed to set the output signal to zero (including a locked rotor condition to the system controller), and turn the motor off and a two minute delay executed by step 518. Thereafter, the controller returns to step 502 to again read the input and initiate the start cycle. If motor rotation is detected, the controller proceeds to step 520 to set the motor torque equal to the actual motor torque plus a predefined delta or differential. In other words, the motor torque is increased by a preset amount. At step 522, the output signal is set equal to the frequency, which is proportional to RPM, when frequency control is used. Step 524 times out a preset period used to control time in the loop so that the motor torque changes by increasing or decreasing at specified time intervals. Loop 512 is then completed by returning to step 510 to determine whether or not the increase in torque has caused the actual operating point to equal or exceed the set point. If it has not, loop 512 is again executed.

Once the actual operating point is equal to or exceeds the set point at step 510, the controller proceeds to step 526. If the actual operating point is greater than the set point, loop 528 is executed. The purpose of loop 528 is to reduce the motor torque. At step 530, the motor torque is reduced by an amount delta. At step 532 the signal output is set equal to the frequency, which is proportional to RPM, when frequency control is used. Step 534 times out a preset period used to control time in the loop so that the motor torque changes by increasing or decreasing at specified time intervals. Thereafter, the loop is closed and step 510 is executed again.

When the actual operating point is equal to the set point (allowing for hysteresis), the controller proceeds from step 508 through steps 510 and 526 to step 536 at which point the output is set equal to the signal with frequency proportional to the motor RPMs. At step 538, the input from the registers or other input is again checked. If the input is requesting the motor to continue to run, step 540 proceeds back to step 510. Otherwise, step 540 proceeds back to the initial read input step 502 to await a request for motor operation.

FIG. 8 illustrates exemplary speed vs. torque curves for either motor 104 or motor 204 driving draft inducer fan 110 or fan 210, respectively. For clarity, the speed/torque curves of FIG. 8 will be described with respect to the operation of controller 102 for controlling motor 104 to drive fan 110.

Controller 102 preferably controls powers switches 107 in accordance with the position of the rotating assembly of motor 104. The rotating assembly's position may be determined by various means, including sensing the back electromotive force (EMF) of the windings. By sensing the back EMF, controller 102 is able to generate a tachometer signal which is representative of the motor speed (as communicated to controller 102 via line 108). Controller 102 is responsive to both the tachometer signal and an external signal, such as a minimum air pressure signal provided by pressure input 112/114. In response to these signals, controller 102 generates a desired current signal as a function of both the minimum air pressure signal and the tachometer signal. Thus, controller 102 constitutes a circuit for generating a desired current signal. In effect, the desired current signal corresponds to a desired torque signal because the torque of the motor is related to the motor current as shown in FIG. 8. The control commands at line 106 are a function of the desired current signal and cause power switches 109 to selectively energize the windings of motor 104.

In a preferred embodiment, the desired current signal generated by controller 102 takes the form of a pulse width modulated (PWM) series of pulses having a duty cycle which is a function of both the minimum air pressure signal and the tachometer signal. Thus, controller 102 constitutes a pulse width modulation circuit. FIG. 8 illustrates the speed/torque curves associated with a desired current signal having a duty cycle of 20%, 30%, 40%, 50%, 60%, 70%, 80%, 90% and 100%.

In another preferred embodiment, the desired current signal limits the current to a set point which is a percentage of the nominal full load current. The set point may be selected, for example, by solving a mathematical algorithm or by ramping the current until pressure sensors, such as pressure sensor 116 or 118, close. As an example, if nominal full load current is 1.06 A and the desired current signal indicates a 20% set point, current is allowed to rise until it reaches 0.21 A. Upon reaching the 0.21 A set point, current is turned off for a preset period of time or until it decays to a preset value. Current is then turned on again until it reaches the set point. In the alternative, FIG. 8 illustrates the speed/torque curves associated with a desired current signal having set points of 20%, 30%, 40%, 50%, 60%, 70%, 80%, 90% and 100% of nominal full load current. As such, controller 102 constitutes a current limit circuit for limiting the duty cycle of the desired current signal or limiting the desired current signal to a set point which is a percentage of nominal full load current.

In this embodiment of the invention, each curve is representative of the torque produced by motor 104 when its windings are energized by a substantially constant current with respect to speed. As shown by these curves, the windings of motor 104 in this embodiment of the invention have a relatively high inductance and less torque is produced in response to a particular current demand at high speeds than at low speeds. For clarity, the speed/torque curves of FIG. 8 are illustrated as smooth lines. However, the actual speed/torque response illustrated by these curves include variations caused by switching noise and the like. Further, it is to be understood that the curves may vary for applications other than those specifically disclosed herein.

Preferably, motor 104 has the ability to provide relatively high torque at variable speeds. However, operation of motor 104 at relatively low speeds, or under abnormal operating conditions, can result in increased operating temperatures, especially when a relatively high torque is demanded. Excessive temperature typically result from increased switching losses due to more rapid pulse width modulation within an undesirable torque/speed area or from inadequate air flow to vent heat from motor 104 when the rotor is rotating at relatively low speeds. If motor 104 exceeds allowable operating temperatures, its electronic control, such as controller 102, can fail. The present invention beneficially provides an area of desired speed/torque operation outside those regions in which temperature of motor 104 or controller 102 is likely.

Referring further to FIG. 8, each of points 602, 604, 606, 608 and 610 are located on a boundary between a desirable operating area and an desirable operating area. In other words, controller 102 inhibits operation of motor 104 in portions of the speed/torque curves indicated in phantom when the requested torque exceeds the torque shown at points 602, 604, 606, 608 and 610 for each motor speed range shown. Conversely, the portions of the speed/torque curves wherein torque is less than that torque shown at points 602, 604, 606, 608 and 610 for each motor speed range shown represent a desired operating area in which operation of motor 104 is permitted. Thus, the illustrated undesirable speed/torque region is bounded generally on the left and the top by a desirable operating region.

Operation of motor 104 is preferably controlled according to a fan operating curve, such as sample fan curve 612, located within the desirable operating region of the speed/torque curves of FIG. 8. However, torque demand varies as load conditions change and operation of motor 104 can deviate from curve 612. As examples, additional curves 614 and 616 illustrate operation of motor 104 to drive fan 110 under less ideal conditions.

In order to prevent operation within the undesirable area, for example, on the operating curve 616, controller 102 inhibits operation of motor 104 when its speed falls below a predetermined speed and the desired torque exceeds a predetermined torque. In other words, controller 102 inhibits motor operation when a current limiting maximum which is a function of motor speed is exceeded. By inhibiting operation of motor 104 when its speed and corresponding desired torque fall within the undesirable operating area, the present invention minimizes the risk of the temperature of motor 104 or controller 102 exceeding the level at which controller 102 may fail.

Curve 612 represents speed and torque points for a particular fan 110. As an example, consider a system operating on fan curve 612 at point A, having a speed of approximately 3000 RPM and a torque of approximately 9 oz.in. A sudden occurrence causing an immediate decrease in motor speed to approximately 1900 RPM shifts the operating point from point A to point B on curve 614, as indicated by arrow 618. Assuming a speed-controlled system, controller 102 will determine that the actual speed (1900 RPM) is less than the target speed (3000 RPM) and increase the set point of the desired current signal by increasing its duty cycle or percentage accordingly. As the set point of the desired current signal is increased, the speed and torque of motor 104 increase to a point C, as indicated by arrow 620. Point C, for example, may be a point at the same speed or at the same air pressure as point A depending on the desired operating characteristics of the system.

As another example, consider a system operating on fan curve 612 at point D having a speed of approximately 4000

RPM and a torque of approximately 14 oz.in. A sudden occurrence causing an immediate decrease in motor speed to approximately 1250 RPM shifts the operating point from point D to point E on curve 616, as indicated by arrow 622. Similarly, operation may shift to point E if motor 104 is misapplied, i.e., it is being used in an application requiring a greater output power than motor 104 is designed to produce. Controller 102 will determine that the actual speed (1250 RPM) is less than the target speed (4000 RPM) and will seek to increase the set point of the desired current signal to increase the speed and torque of motor 104. However, since point E is in the undesirable operating area, controller 102 acts to inhibit operation of motor 104. In this particular example, operation is inhibited at speeds below approximately 1500 RPM when desired current exceeds 50%, or desired torque exceeds approximately 15 oz.in, as shown at point 602. Controller 102 sets the set point of the desired current signal to 50% at point F, as indicated by arrow 624. As such, motor 104 is no longer permitted to operate within the undesirable operating area. Controller 102 essentially "folds back" the current to the windings of motor 104 as a function of the motor speed to limit torque thereby maintaining a desired operating temperature. In some circumstances, torque may be produced by motor 104 inadequate to sustain rotation of fan 110 and motor 104 will stall. Otherwise, motor 104 will continue to operate at a reduced speed and torque. In either instance, controller 102 prevents the generation of excessive heat due to operation in the undesirable region of the speed/torque curves. Further, by controlling maximum current, controller 102 prevents the generation of excessive heat due to operation when the produced torque is permissible but the current is excessive. For example, the windings of motor 104 may carry excessive current if its magnets are weak or its bearings are frozen.

According to the present invention, controller 102 prevents operation in the undesirable area and protects against the temperature of controller 102 exceeding a level that may cause it to fail regardless of the external signal control being employed to control motor commutation. In other words, protection against excessive temperatures is provided whether a motor is torque controlled, speed controlled, operating to maintain a constant pressure or operating to maintain a constant CFM. Moreover, persons skilled in the art will understand that the use of a desired operating area may be readily implemented with motor and control circuits different from those specifically disclosed herein. For example, this aspect of the invention may be applied to applications wherein switched reluctance motors and variable speed induction motors, in addition to electronically commutated motors, are used for driving a draft inducer fan, a blower motor, washing machine or another rotatable component.

Further, parameters corresponding to the predetermined values representing maximum current demand (corresponding to maximum torque demand) and minimum speed, as illustrated at points 602, 604, 606, 608 and 610, are programmable and stored in memory 120 for defining the desired and undesirable operating areas. Since different applications will be more or less susceptible to overheating and will have lower or higher desired operating temperatures, the present invention is readily adaptable to numerous different applications.

Figure 9B:
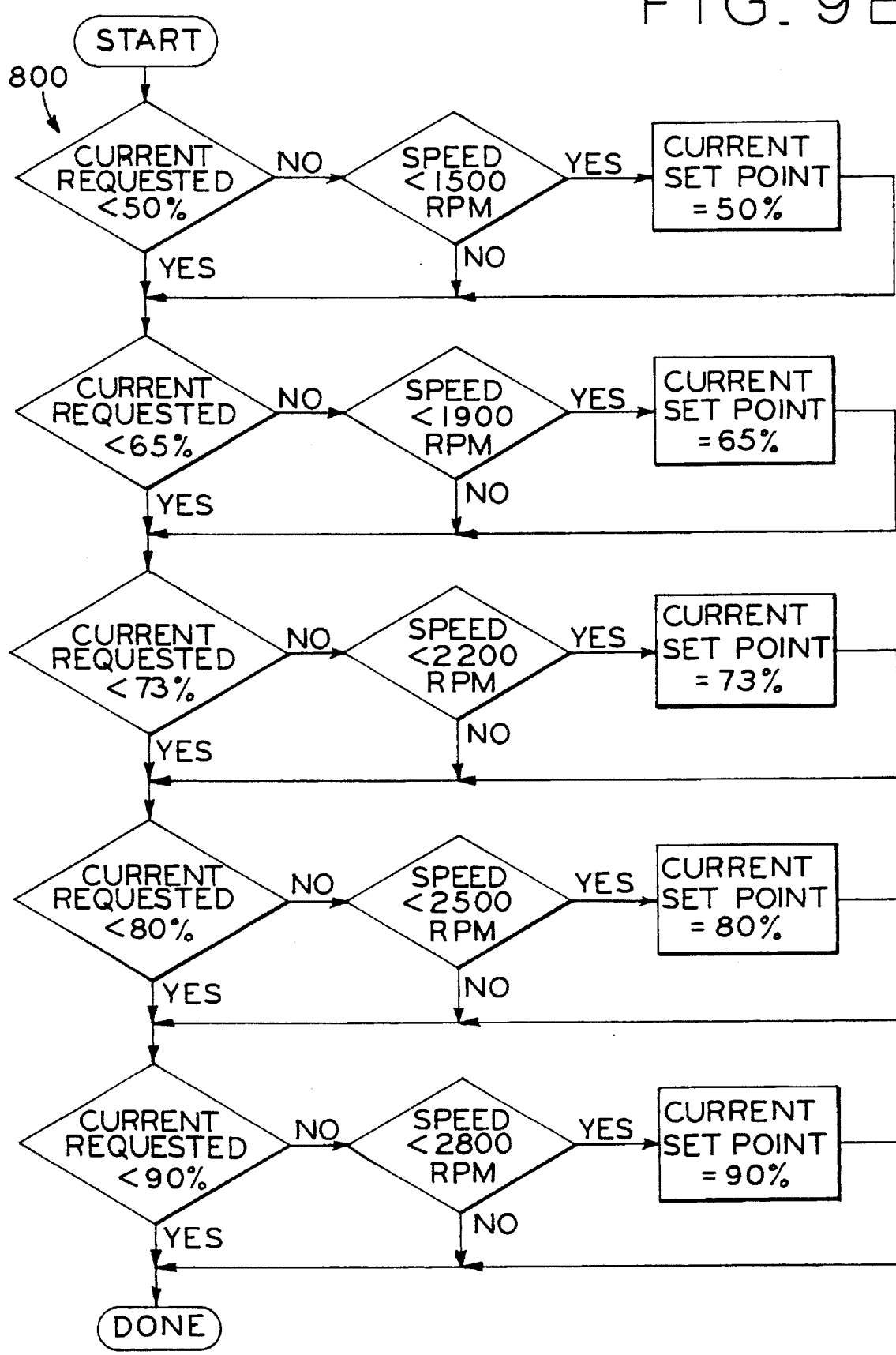

FIGS. 9A and 9B show alternative flow charts for operating controller 102, 152 or 202 to provide a desired operating area according to the invention. For clarity, the flow charts will be described with respect to the operation of controller 102 for controlling motor 104. Appendix A discloses exemplary production code for implementing a flow chart 700 based on speed control as illustrated in FIG. 9A. According to one preferred embodiment of the invention, microprocessor 126 (see FIG. 1) performs current limiting, speed comparing, and current comparing and IC 128 performs pulse width modulating and speed sensing as set forth in FIGS. 9A and 9B.

As shown in FIG. 9A, flow chart 700 preferably includes a plurality of loops, for example, loops 702, 704, 706, 708 and 710. Flow chart 700 begins at a start step 712 and proceeds to the loop 702. In a step 714, controller 102 reads the speed of motor 104 and determines whether the speed is less than a predetermined minimum speed $S_1$, for example 1500 RPM. As such, controller 102 constitutes a circuit for comparing the tachometer signal to a reference speed. If the measured speed is less than $S_1$, controller 102 operates within loop 702 to compare the desired or requested current and, thus, the desired or requested torque, to a predetermined maximum current $I_1$ at a step 716. As described above, controller 102 responds to a signal having a set point corresponding to a percentage of desired torque. The windings of motor 104 are selectively energized by pulse width modulation of the current at a duty cycle representative of the desired motor torque.

The maximum current for loop 702 is 50% of full current, which corresponds to a minimum speed of 1500 RPM. If the desired current is greater than $I_1$, controller 102 proceeds to a step 718 to limit, or fold back, the current applied to the windings of motor 104 so that the current is limited by $I_1$ so long as motor 104 is operating in this speed range. Controller 102 limits the current by limiting the duty cycle of the pulse width modulated desired current signal to a duty cycle corresponding to the predetermined current (i.e., a predetermined torque) or by limiting the percentage of nominal full load current by limiting the desired current signal to have a set point corresponding to the predetermined current. Although current demand may continue to exceed $I_1$, controller 102 will continue to inhibit operation of motor 104 in the undesirable speed/torque region. If the current demand is less than $I_1$ as determined by step 716 or if the current has been limited to $I_1$ by step 718, controller 102 has confirmed that the motor is operating in the desirable speed/torque region and proceeds to step 746.

On the other hand, if the speed of motor 104 is greater than $S_1$, controller 102 proceeds from step 714 to step 720 and operates in the loop 704. Loop 704 is identical in operation to loop 702 but includes different minimum speed and maximum current values. In other words, the minimum speed is $S_2$ and the maximum current is $I_2$. Preferably, $S_2$ is greater than $S_1$ and $I_2$ is greater than $I_1$. For example, $S_2$ is 1900 RPM and $I_2$ is 65%.

As shown in loop 704 of flow chart 700, controller 102, in step 720, reads the speed of motor 104 and determines whether the speed is less than the predetermined minimum speed $S_2$. If the measured speed is less than $S_2$, controller 102 operates within loop 704 to compare the desired current to the predetermined maximum current $I_2$ at a step 722. If the desired current is greater than $I_2$, controller 102 proceeds to a step 724 in which it limits the current applied to the windings of motor 104 so that the current is limited and a set point of $I_2$ is established so long as the speed of motor 104 is less than $S_2$. On the other hand, if the speed of motor 104 is greater than $S_2$, controller 102 proceeds from step 720 to step 726 and operates in the loop 706.

In loop 706, controller 102 reads the speed of motor 104 at a step 726, and determines whether the speed is less than a predetermined minimum speed $S_3$, for example 2200 RPM. If the measured speed is less than $S_3$, controller 102 operates within loop 706 at a step 728 to compare the desired current to a predetermined maximum current $I_3$, for example 73%. If the desired current is greater than $I_3$, controller 102 proceeds to a step 730 in which it limits the current applied to the windings of motor 104 so that the current is limited and a set point of $I_3$ is established so long as the speed of motor 104 is less than $S_3$. On the other hand, if the speed of motor 104 is greater than $S_3$, controller 102 proceeds from step 726 to step 732 and operates in the loop 708.

Loop 708 is identical in operation to loop 706 but includes different predetermined values. For example, a minimum speed $S_4$ is 2500 RPM and a maximum current $I_4$ is 80%. Loop 708 includes a step 732 corresponding to step 726, a step 734 corresponding to step 728 and a step 736 corresponding to step 730. Likewise, the loop 710 is identical in operation to loop 708 but includes different predetermined values. For example, a minimum speed $S_5$ is 2800 RPM and a maximum current $I_5$ is 90%. Loop 710 includes a step 738 corresponding to step 732, a step 740 corresponding to step 734 and a step 742 corresponding to step 736. With respect to loop 710, however, controller 102 proceeds to a step 744 if the speed of motor 104 is greater than $S_5$. At step 744, controller 102 does not limit the current of motor 104 because its operation is well within the safe operating area. At step 746, the analysis in complete and controller 102 returns by step 712 to start again.

FIG. 9B shows an alternative flow chart 800 for accomplishing aspects of the present invention based on current control. Although similar to flow chart 700, flow chart 800 first compares the requested current to the predetermined current limits described with respect to FIG. 9A. Flow chart 800 then compares the speed of motor 104 to the predetermined speeds described with respect to FIG. 9A.

As described above, the predetermined maximum current value is a function of speed and differs depending on the speed at which motor 104 is operating. The following Table 1 shows the various predetermined maximum current values and the corresponding predetermined speed values of which they are a function as described with respect to flow charts 700 and 800. Although Table 1 shows discrete values of maximum current and corresponding speed, it is contemplated that maximum current as a function of speed may be defined by an algorithm executed by controller 102.

TABLE 1

| Current | Speed (RPM) |
|---|---|
| $I_1 = 50\%$ | $S_1 = 1500$ |
| $I_2 = 65\%$ | $S_2 = 1900$ |
| $I_3 = 73\%$ | $S_3 = 2200$ |
| $I_4 = 80\%$ | $S_4 = 2500$ |
| $I_5 = 90\%$ | $S_5 = 2800$ |

In operation, a commutating circuit constituted by controller 102 is responsive to an external signal, such as a pressure signal representative of a minimum air pressure in the HVAC system's vent, and a tachometer signal representative of the speed of the motor. The commutating circuit of controller 102 controls power switches 109 via line 106 and includes a control circuit which limits the current provided to the windings by power switches 109 to a predetermined maximum current. The predetermined maximum current is a function of the speed of the motor as represented by the tachometer signal and is used to inhibit operation of motor 104 outside a predefined speed/current or speed/torque region. By limiting the current, the control circuit prevents the current from exceeding a predetermined maximum current. In other words, motor 104 is prevented from producing a torque in excess of a predetermined torque when it is operating at a speed less than a predetermined speed. The predetermined current or torque and the predetermined speed are within the pre-defined speed/current or speed/torque region and correspond to the predetermined maximum current so that excessive heat is not generated during operation of motor 104 thereby minimizing the risk of overheating the temperature of controller 102 exceeding the level at which controller 102 may fail.

In view of the above, it will be seen that the several objects of the invention are achieved and other advantageous results attained.

As various changes could be made in the above products and methods without departing from the scope of the invention, it is intended that all matter contained in the above description and shown in the accompanying drawings shall be interpreted as illustrative and not in a limiting sense.

What is claimed is:

1. A system for driving a rotatable component in response to an external signal corresponding to a desired motor current, said system having an operating region outside of which excessive heat may be generated by the system, said system comprising:

a motor having a stationary assembly and a rotatable assembly in magnetic coupling relation thereto, the stationary assembly including windings adapted to be energized in at least one preselected sequence, the rotatable assembly in driving relation to the rotatable component;

power switching devices responsive to a motor control signal for selectively connecting a power supply to the windings to provide a motor current to the windings in the preselected sequence to produce an electromagnetic field for rotating the rotatable assembly at a motor operating speed;

a speed sensing circuit for generating a tachometer signal representative of the motor operating speed; and a controller comparing the motor operating speed as represented by the tachometer signal to a reference speed and comparing the desired motor current as represented by the external signal to a maximum current which is a function of the motor operating speed and responsive to the external signal and the tachometer signal for generating the motor control signal to control the power switching devices, the controller generating the motor control signal so that a current corresponding to the desired motor current is provided to the windings by the power switching devices when the motor operating speed is greater than or equal to the reference speed, the controller generating the motor control signal so that a current corresponding to the maximum current is provided to the windings by the power switching devices when the motor operating speed is less than the reference speed and the desired motor current is greater than or equal to the maximum current thereby maintaining operation of the motor within a speed/current region defined by the reference speed and the maximum current whereby excessive heat is prevented from being generated by the system.

2. The system of claim 1 wherein the controller comprises a processor for generating a current signal as a function of the external signal and the tachometer signal, and wherein the controller generates the motor control signal as a function of the current signal so that the motor produces a motor torque corresponding to the desired motor current at the motor operating speed when the motor operating speed is greater than or equal to the reference speed and produces a motor torque corresponding to a current less than or equal to the maximum current at the motor operating speed when the motor operating speed is less than the reference speed.

3. The system of claim 2 further comprising a memory for storing parameters corresponding to and defining the reference speed and the maximum current, said maximum current corresponding to the reference speed, wherein the defined speed/current region has a boundary defined by the reference speed and the maximum current, and wherein the processor generates the current signal in response to the external signal, the tachometer signal and the parameters stored in the memory.

4. The system of claim 3 wherein the memory stores parameters corresponding to and defining an additional reference speed greater than the reference speed and an additional maximum current greater than the maximum current, said additional maximum current corresponding to the additional reference speed, wherein the boundary of the defined speed/current region is further defined by the additional reference speed and the additional maximum current, and wherein the current signal is representative of the additional maximum current when the motor operating speed is in excess of the reference speed and less than the additional reference speed and the desired motor current is greater than or equal to the additional maximum current.

5. The system of claim 2 wherein the processor comprises a pulse width modulation circuit, the current signal being a pulse width modulated signal having a duty cycle representative of the desired motor current and corresponding to the desired motor torque when the motor operating speed is greater than or equal to the reference speed and having a duty cycle corresponding to the maximum current and corresponding to the maximum motor torque when the motor operating speed is less than the reference speed and the desired motor current is greater than or equal to the maximum current.

6. The system of claim 2 wherein the maximum current is a percentage of a nominal full load motor current provided to the windings by the power switching devices.

7. The system of claim 1 wherein the rotatable component is a fan for inducing a draft in a vent of a heating, ventilating and air conditioning system and the external signal is representative of a minimum air pressure in the vent.

8. A method of operating a system for driving a rotatable component in response to an external signal corresponding to a desired motor current, the system including a motor having a stationary assembly and a rotatable assembly in magnetic coupling relation thereto, the stationary assembly including windings adapted to be energized in at least one preselected sequence, the rotatable assembly in driving relation to the rotatable component, the system having an operating region outside of which excessive heat may be generated by the system, the method comprising:

controlling power switching devices in response to a motor control signal for selectively connecting a power supply to the windings to provide a motor current to the windings in the preselected sequence to produce an electromagnetic field for rotating the rotatable assembly at a motor operating speed;

sensing the speed of the motor and generating a tachometer signal representative of the motor operating speed;

defining a speed/current region of desired motor operation by a reference speed and a maximum current which is a function of the motor operating speed as represented by the tachometer signal;

comparing the motor operating speed as represented by the tachometer signal to the reference speed to determine when the motor operating speed is greater than or equal to the reference speed and to determine when the motor operating speed is less than the reference speed;

comparing the desired motor current as represented by the external signal to the maximum current to determine when the desired maximum current is greater than or equal to the maximum current;

generating the motor control signal in response to the external signal and the tachometer signal for controlling the power switching devices so that a current corresponding to the desired motor current is provided to the windings by the power switching devices when the motor operating speed is greater than or equal to the reference speed; and generating the motor control signal in response to the external signal and the tachometer signal for controlling the power switching devices so that a current corresponding to the maximum current is provided to the windings by the power switching devices when the motor operating speed is less than the reference speed and the desired motor current is greater than or equal to the maximum current thereby maintaining operation of the motor within the defined speed/current region whereby excessive heat is prevented from being generated by the system.

9. The method of claim 8 wherein the step of generating the motor control signal includes generating a current signal as a function of the external signal and the tachometer signal and generating the motor control signal as a function of the current signal for controlling the power switching devices to commutate the windings so that the motor produces a motor torque corresponding to the desired motor current at the motor operating speed when the motor operating speed is greater than or equal to the reference speed and produces a motor torque corresponding to a current less than or equal to the maximum current at the motor operating speed when the motor operating speed is less than the reference speed.

10. The method of claim 9 further comprising the steps of storing in a memory parameters corresponding to and defining the reference speed and the maximum current, said maximum current corresponding to the reference speed, wherein the defined speed/current region has a boundary defined by the reference speed and the maximum current, and wherein the step of generating the current signal includes generating the current signal in response to the external signal, the tachometer signal and the parameters stored in the memory.

11. The method of claim 10 further comprising the steps of storing in the memory parameters corresponding to and defining an additional reference speed greater than the reference speed and an additional maximum current greater than the maximum current, said additional maximum current corresponding to the additional reference speed, wherein the boundary of the defined speed/current region is further defined by the additional reference speed and the additional maximum current; and wherein the current signal is representative of the additional maximum current when the motor operating speed is in excess of the reference speed and less than the additional reference speed and the desired motor current is greater than or equal to the additional maximum current.

12. The method of claim 9 wherein the step of generating the current signal includes pulse width modulating the current signal at a duty cycle representative of the desired motor current and corresponding to a desired motor torque when the motor operating speed is greater than or equal to the reference speed and pulse width modulating the current signal at a duty cycle corresponding to the maximum current and corresponding to a maximum motor torque when the motor operating speed is less than the reference speed and the desired motor current is greater than or equal to the maximum current.

13. The method of claim 9 wherein the step of generating the current signal includes limiting the current signal to be representative of a percentage of a nominal full load motor current provided to the windings by the power switching devices.

14. A heating, ventilation and air conditioning system comprising:

a fan for inducing a draft through a vent;

a motor for driving the fan having a stationary assembly and a rotatable assembly in magnetic coupling relation thereto, the stationary assembly including windings adapted to be energized in at least one preselected sequence, the rotatable assembly in driving relation to the fan, the motor having an operating region outside of which excessive heat may be generated by the motor;

power switching devices responsive to a motor control signal for selectively connecting a power supply to the windings to provide a motor current to the windings in the preselected sequence to produce an electromagnetic field for rotating the rotatable assembly at a motor operating speed;

a speed sensing circuit for generating a tachometer signal representative of the motor operating speed;

a pressure sensor for generating a pressure signal representative of a minimum pressure in the vent and corresponding to a desired motor current at the motor operating speed; and a controller comparing the motor operating speed as represented by the tachometer signal to a reference speed and comparing the desired motor current as represented by the pressure signal to a maximum current which is a function of the motor operating speed and responsive to the pressure signal and the tachometer signal for generating the motor control signal to control the power switching devices, the controller generating the motor control signal so that a current corresponding to the desired motor current is provided to the windings by the power switching devices when the motor operating speed is greater than or equal to the reference speed, the controller generating the motor control signal so that a current corresponding to the maximum current is provided to the windings by the power switching devices when the motor operating speed is less than the reference speed and the desired motor current is greater than or equal to the maximum current thereby maintaining operation of the motor within a speed/current region defined by the reference speed and the maximum current whereby excessive heat is prevented from being generated by the motor.

15. A method of operating a heating, ventilating, and/or air conditioning system having a fan for inducing a draft through a vent and a motor for driving the fan, the motor having a stationary assembly and a rotatable assembly in magnetic coupling relation thereto, the stationary assembly including windings adapted to be energized in at least one preselected sequence, the rotatable assembly in driving relation to the fan, the motor having an operating region outside of which excessive heat may be generated by the motor, the method comprising:

controlling power switching devices in response to a motor control signal for selectively connecting a power supply to the windings to provide a motor current to the windings in the preselected sequence to produce an electromagnetic field for rotating the rotatable assembly at a motor operating speed;

sensing the speed of the motor and generating a tachometer signal representative of the motor operating speed;

sensing pressure in the vent and generating a pressure signal representative of a minimum pressure in the vent and corresponding to a desired motor current at the motor operating speed;

defining a speed/current region of desired motor operation by a reference speed and a maximum current which is a function of the motor operating speed as represented by the tachometer signal;

comparing the motor operating speed as represented by the tachometer signal to the reference speed to determine when the motor operating speed is greater than or equal to the reference speed and to determine when the motor operating speed is less than the reference speed;

comparing the desired motor current as represented by the pressure signal to the maximum current to determine when the desired maximum current is greater than or equal to the maximum current;

generating the motor control signal in response to the pressure signal and the tachometer signal for controlling the power switching devices so that a current corresponding to the desired motor current is provided to the windings by the power switching devices when the motor operating speed is greater than or equal to the reference speed; and generating the motor control signal in response to the pressure signal and the tachometer signal for controlling the power switching devices so that a current corresponding to the maximum current is provided to the windings by the power switching devices when the motor operating speed is less than the reference speed and the desired motor current is greater than or equal to the maximum current thereby maintaining operation of the motor within the defined speed/current region whereby excessive heat is prevented from being generated by operation of the motor.

16. A motor and control system having an operating region outside of which excessive heat may be generated by the motor, said motor and control system comprising:

a stationary assembly and a rotatable assembly in magnetic coupling relation thereto, the stationary assembly including windings adapted to be energized in at least one preselected sequence;

power switching devices responsive to a motor control signal for selectively connecting a power supply to the windings to provide a motor current to the windings in the preselected sequence to produce an electromagnetic field for rotating the rotatable assembly at a motor operating speed;

a speed sensing circuit for generating a tachometer signal representative of the motor operating speed; and a controller comparing the motor operating speed as represented by the tachometer signal to a reference speed and comparing a desired motor current at the motor operating speed as represented by an external signal to a maximum current which is a function of the motor operating speed and responsive to the external signal and the tachometer signal for generating the motor control signal to control the power switching devices, the controller generating the motor control signal so that a current corresponding to the desired motor current is provided to the windings by the power switching devices when the motor operating speed is greater than or equal to the reference speed, the controller generating the motor control signal so that a current corresponding to the maximum current is provided to the windings by the power switching devices when the motor operating speed is less than the reference speed and the desired motor current is greater than or equal to the maximum current thereby maintaining operation of the motor within a speed/current region defined by the reference speed and the maximum current whereby excessive heat is prevented from being generated by the motor.

17. A method of operating a motor having a stationary assembly and a rotatable assembly in magnetic coupling relation thereto, the stationary assembly including windings adapted to be energized in at least one preselected sequence, the motor having an operating region outside of which excessive heat may be generated by the motor, the method comprising:

controlling power switching devices in response to a motor control signal for selectively connecting a power supply to the windings to provide a motor current to the windings in the preselected sequence to produce an electromagnetic field for rotating the rotatable assembly at a motor operating speed;

sensing the speed of the motor and generating a tachometer signal representative of the motor operating speed;

defining a speed/current region of desired motor operation by a reference speed and a maximum current which is a function of the motor operating speed as represented by the tachometer signal;

comparing the motor operating speed as represented by the tachometer signal to the reference speed to determine when the motor operating speed is greater than or equal to the reference speed and to determine when the motor operating speed is less than the reference speed;

comparing a desired motor current at the motor operating speed as represented by an external signal to the maximum current to determine when the desired maximum current is greater than or equal to the maximum current;

generating the motor control signal in response to the external signal and the tachometer signal for controlling the power switching devices so that a current corresponding to the desired motor current is provided to the windings by the power switching devices when the motor operating speed is greater than or equal to the reference speed; and generating the motor control signal in response to the external signal and the tachometer signal for controlling the power switching devices so that a current corresponding to the maximum current is provided to the windings by the power switching devices when the motor operating speed is less than the reference speed and the desired motor current is greater than or equal to the maximum current thereby maintaining operation of the motor within the defined speed/current region whereby excessive heat is prevented from being generated by operation of the motor.

18. In a heating, ventilating and air conditioning system having a fan driven by a motor for inducing a draft through a vent, the motor having a stationary assembly and a rotatable assembly in magnetic coupling relation thereto, the stationary assembly including windings adapted to be energized in at least one preselected sequence for producing an electromagnetic field for rotating the rotatable assembly at a motor operating speed, the rotatable assembly in driving relation to the fan, the motor having an operating region outside of which excessive heat may be generated by the motor and/or a controller for the motor, the controller comprising:

a commutating circuit responsive to a pressure signal and a tachometer signal for generating a motor control signal, said pressure signal being representative of a minimum air pressure in the vent and corresponding to a desired motor current at the motor operating speed and said tachometer signal being representative of the motor operating speed;

a comparing circuit comparing the motor operating speed as represented by the tachometer signal to a reference speed, said motor control signal controlling power switching devices for selectively connecting a power supply to the windings to provide a current corresponding to the desired motor current to the windings in the preselected sequence when the motor operating speed is greater than or equal to the reference speed; and a current limit circuit for limiting the motor control signal so that a current corresponding to a maximum current less than or equal to the desired motor current is provided to the windings by the power switching devices when the motor operating speed is less than the reference speed thereby maintaining operation of the motor within a speed/current region defined by the reference speed and the maximum current whereby excessive heat is prevented from being generated by the motor and/or controller.

19. In a heating, ventilating and air conditioning system having a fan driven by a motor for inducing a draft through a vent, the motor having a stationary assembly and a rotatable assembly in magnetic coupling relation thereto, the stationary assembly including windings adapted to be energized in at least one preselected sequence to produce an electromagnetic field for rotating the rotatable assembly at a motor operating speed, the rotatable assembly in driving relation to the fan, the motor having an operating region outside of which excessive heat may be generated by the motor, a method for controlling the motor comprising the steps of:

generating a motor control signal in response to a pressure signal and a tachometer signal, said pressure signal being representative of a minimum air pressure in the vent and corresponding to a desired motor current at the motor operating speed and said tachometer signal being representative of the motor operating speed;

comparing the motor operating speed as represented by the tachometer signal to a reference speed;

controlling power switching devices in response to the motor control signal for selectively connecting a power supply to the windings to provide a current corresponding to the desired motor current to the windings in the preselected sequence when the motor operating speed is greater than or equal to the reference speed; and limiting the motor control signal so that a current corresponding to a maximum current less than or equal to the desired motor current and which is a function of the motor operating speed is provided to the windings by the power switching devices when the motor operating speed is less than the reference speed thereby maintaining operation of the motor within a speed/current region defined by the reference speed and the maximum current whereby excessive heat is prevented from being generated by operation of the motor.

20. A system for driving a rotatable component in response to an external signal corresponding to a desired motor torque, said system having an operating region outside of which excessive heat may be generated by the system, said system comprising:

a motor having a stationary assembly and a rotatable assembly in magnetic coupling relation thereto, the stationary assembly including windings adapted to be energized in at least one preselected sequence, the rotatable assembly in driving relation to the rotatable component;

power switching devices responsive to a motor control signal for selectively connecting a power supply to the windings to provide current to the windings in the preselected sequence to produce an electromagnetic field for rotating the rotatable assembly;

a speed sensing circuit for generating a tachometer signal representative of the speed of the motor; and a controller comparing the speed of the motor as represented by the tachometer signal to a reference speed and comparing the desired motor torque as represented by the external signal to a reference torque which is a function of the speed of the motor and responsive to the external signal and the tachometer signal for generating the motor control signal to control the power switching devices, the controller generating the motor control signal so that a desired current corresponding to the desired motor torque is provided to the windings by the power switching devices when the speed of the motor is greater than or equal to the reference speed, the controller generating the motor control signal so that a maximum current corresponding to a the reference torque is provided to the windings by the power switching devices when the speed of the motor is less than the reference speed and the desired motor torque is greater than or equal to the reference torque thereby maintaining operation of the motor within a speed/torque region defined by the reference speed and the reference torque whereby excessive heat is prevented from being generated by the system.

21. A method of operating a system for driving a rotatable component in response to an external signal corresponding to a desired motor torque, the system including a motor having a stationary assembly and a rotatable assembly in magnetic coupling relation thereto, the stationary assembly including windings adapted to be energized in at least one preselected sequence, the rotatable assembly in driving relation to the rotatable component, the system having an operating region outside of which excessive heat may be generated by the system, the method comprising:

controlling power switching devices in response to a motor control signal for selectively connecting a power supply to the windings to provide current to the windings in the preselected sequence to produce an electromagnetic field for rotating the rotatable assembly;

sensing the speed of the motor and generating a tachometer signal representative thereof;

defining a speed/torque region of desired motor operation by a reference speed and a reference torque which is a function of the speed of the motor as represented by the tachometer signal;

comparing the speed of the motor as represented by the tachometer signal to the reference speed to determine when the speed of the motor is greater than or equal to the reference speed and to determine when the speed of the motor is less than the reference speed;

comparing the desired motor torque as represented by the external signal to the reference torque to determine when the desired motor torque is greater than or equal to the reference torque;

generating the motor control signal in response to the external signal and the tachometer signal for controlling the power switching devices so that a desired current corresponding to the desired motor torque is provided to the windings by the power switching devices when the speed of the motor is greater than or equal to the reference speed; and generating the motor control signal in response to the external signal and the tachometer signal for controlling the power switching devices so that a maximum current corresponding to the reference torque is provided to the windings by the power switching devices when the speed of the motor is less than the reference speed and the desired motor torque is greater than or equal to the reference torque thereby maintaining operation of the motor within the defined speed/torque region whereby excessive heat is prevented from being generated by the system.

* * * * *